United States Patent
Prescott et al.

(10) Patent No.: US 11,225,200 B2
(45) Date of Patent: *Jan. 18, 2022

(54) VEHICULAR RACK HAVING MODULAR DESIGN WITH OUTSIDE HANDLE AND QUICK RELEASE

(71) Applicant: Thule Sweden AB, Hillerstorp (SE)

(72) Inventors: Keith L. Prescott, Cambridge, VT (US); Jeffrey R. Edgerly, Bristol, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,290

(22) Filed: Apr. 27, 2021

(65) Prior Publication Data
US 2021/0245673 A1 Aug. 12, 2021

Related U.S. Application Data

(63) Continuation of application No. 16/534,687, filed on Aug. 7, 2019, now Pat. No. 11,155,217, which is a
(Continued)

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .... B60R 9/10; B60R 9/06; B60R 9/04; B60R 9/048; B60R 9/08; B60R 11/06;
(Continued)

(56) References Cited

U.S. PATENT DOCUMENTS 3,655,082 A 4/1972 Garrett
4,400,129 A 8/1983 Eisenberg et al.
(Continued)

FOREIGN PATENT DOCUMENTS

CN 2763133 3/2006
DE 102005061449 7/2007
(Continued)

OTHER PUBLICATIONS

Kuat, "NV Add-On," URL: https://web.archive.org/web/20130907014426/http://kuatracks.com/en/products/hitch/nv-add-on/.
(Continued)

*Primary Examiner* — Nathan J Newhouse
*Assistant Examiner* — Matthew T. Theis
(74) *Attorney, Agent, or Firm* — Sterne, Kessler, Goldstein & Fox P.L.L.C.

(57) ABSTRACT

A bicycle carrier includes a vehicle engaging frame portion configured to be coupled a carrying vehicle and a rearward extending support member coupled to the vehicle engaging frame portion by a variably configurable hub configured to set the support member in a plurality of orientations relative to the vehicle engaging frame portion. The support member accommodates one or more bicycles and the support member is configured to be coupled to an add-on support member that accommodates one or more additional bicycles. The add-on support member includes an actuator configured to set the support member in the plurality of orientations relative to the vehicle engaging frame.

20 Claims, 26 Drawing Sheets

Related U.S. Application Data continuation of application No. 14/845,640, filed on Sep. 4, 2015, now Pat. No. 10,384,620.

(60) Provisional application No. 62/048,257, filed on Sep. 9, 2014.

(58) Field of Classification Search
CPC ....... B60R 9/065; B62H 3/10; Y10S 224/924; B60D 1/52; Y10T 403/7071
USPC ............. 224/521, 519, 513, 539, 324; 211/5
See application file for complete search history.

(56) References Cited

U.S. PATENT DOCUMENTS

| | | | |
|---|---|---|---|
| 5,456,564 A | 10/1995 | Bianchini | |
| 5,497,927 A * | 3/1996 | Peterson | B60R 9/10 224/519 |
| 5,947,357 A | 9/1999 | Surkin | |
| 6,129,371 A | 10/2000 | Powell | |
| 6,485,243 B1 | 11/2002 | Ferman | |
| 7,410,082 B2 | 8/2008 | Stewart | |
| 7,806,308 B2 | 10/2010 | Gunn | |
| 2005/0056672 A1 | 3/2005 | Stewart | |
| 2008/0073395 A1 | 3/2008 | Reeves et al. | |
| 2008/0099522 A1 * | 5/2008 | Clausen | B60R 9/10 224/519 |
| 2011/0011909 A1 | 1/2011 | Liu | |
| 2014/0246467 A1 | 9/2014 | Hein et al. | |
| 2015/0021371 A1 | 1/2015 | Ward et al. | |

FOREIGN PATENT DOCUMENTS

| | | | | |
|---|---|---|---|---|
| EP | 1059205 | 7/2003 | | |
| EP | 2033845 | 11/2009 | | |
| WO | WO-2013022671 A * | 2/2013 | ............... | B60R 9/06 |

OTHER PUBLICATIONS

Kuat, "The NV," URL: https://web.archive.org/web/20120325173603/http:/kuatracks.com/products/bike/the-nv/.

Thule Sweden, "T2 918XTR—2 Bike Add-On For (2" Hitch)."

Saris Cycle Racks, "Freedom Superclamp."

Inno Advanced Car Racks, "INH305 Tire Hold Hitch Instruction Manual."

"Thule Presents the New Thule NeloCompact 926 3bike Carrier Equipped with the Next Generation Tow Ball Coupling," dated Aug. 27, 2014.

ThuleBringYourLife, "Bike Carrier Towbar—Thule EuroClassic G6 with Thule AcuTight knobs," dated Mar. 12, 2014, URL: https://www.youtube.com/watch?v=9DaOSiGXbKo.

Thule Sweden, "Thule VeloCompact 926."

Yakima Racks, "Yakima [] RidgeBack Bike Rack [] Product Tour & Installation," dated Mar. 13, 2014, URL: https://www.youtube.com/watch?v=HAPy7Tqf2So.

Saris, "From Chris's Garage: The Freedom SuperClamp," dated Jun. 20, 2014, URL: https://www.youtube.com/watch?v=p0gv2b116Qw.

The Roof Box Company, "ATERA—Strada DL—Tow ball mounted bike carrier," dated Jul. 7, 2011, URL: https://www.youtube.com/watch?v=Z0G2fkVQpml.

Atera, "Carrier Systems 2013/2014," URL: https://autofix.nu/upload_dir/shop/Atera-Katelog-20132014.pdf.

Orsracksdirect, "Inno INH305 / INH306 Tire Hold Hitch Bike Rack Review & How-To Video - ORS Racks Direct," dated Jul. 23, 2013, URL: https://www.youtube.com/watch?v=Qgv3yj8njtw.

Saris Cycling Group, Inc., Freedom Superclamp, Web page/pdf file http://www.saris.com/uploads/PDF/Manuals/Freedom_SuperClamp/FreedomSuperClamp-4.pdf, 9 pages, published on Aug. 12, 2014, retrieved from Internet Archive Wayback Machine https://web.archive.org/web/20140812031151/http://www.saris.com/uploads/PDF/Manuals/Freedom_SuperClamp/FreedomSuperClamp-4.pdf on Nov. 5, 2021 (Publication A).†

Inno Advanced Car Racks / Car Mate USA, INH305 Tire Hold Hitch Instruction Manual, Web page/pdf file http://www.innoracks.com/support/instructions/INH305_EN.pdf,8 pages, published on Sep. 2, 2013, retrieved from Internet Archive Wayback Machine https://web.archive.org/web/20130902004206/http://www.innoracks.com/support/instructions/INH305_EN.pdf on Nov. 5, 2021 (Publication C).†

Doug Mitchell, 1UP USA Quik-Rack One Bike Add on, Web video screenshots, uploaded Sep. 24, 2011, https://www.youtube.com/watch?v=9wCp5vjjz7l&t=1s, 7 pages, retrieved on Nov. 5, 2021 (Publication D).†

Thule, T2 918XTR-2 Bike Add-On for (2 Hitch), Web page/pdf file http://cdn3.static-tgdp.com/assetloader.axd?pimid=918XTR&id=320474&brand=Thule&market=US, 8 pages, published on Jul. 30, 2013, retrieved from Internet Archive Wayback Machine https://web.archive.org/web/20130730132406/http://cdn3.static-tgdp.com/assetloader.axd?pimid=918XTR&id=320474&brand=Thule&market=US on Nov. 5, 2021 (Publication B).†

* cited by examiner
† cited by third party ial rack support arrangement. For example, the vehicu-
VEHICULAR RACK HAVING MODULAR DESIGN WITH OUTSIDE HANDLE AND QUICK RELEASE

CROSS REFERENCE TO RELATED APPLICATION

This application is a continuation of U.S. application Ser. No. 16/534,687, filed Aug. 7, 2019, which is a continuation of U.S. application Ser. No. 14/845,640, filed Sep. 4, 2015, which claims priority to U.S. Provisional Application No. 62/048,257, filed Sep. 9, 2014. Each of these applications is hereby incorporated herein in its entirety by reference.

FIELD

The present disclosure relates generally to a hitch-mount bicycle carrier. More specifically, embodiments within this disclosure relate to a mechanism configured to secure a support bar to a load bar; and in some instances, the mechanism is configured to allow translational movement of the support bar relative to the load bar.

BACKGROUND

Safely and conveniently transporting sports equipment is a concern for many sports enthusiasts. For example, canoes, kayaks, and bicycles can be carried on a vehicle by being attached to one or more load bars. Typically, the load bars are oriented essentially horizontally and crosswise to the direction of travel.

BRIEF DESCRIPTION OF THE DRAWINGS

Implementations of the present application will now be described, by way of example only, with reference to the attached figures.

DETAILED DESCRIPTION

Figure 1:
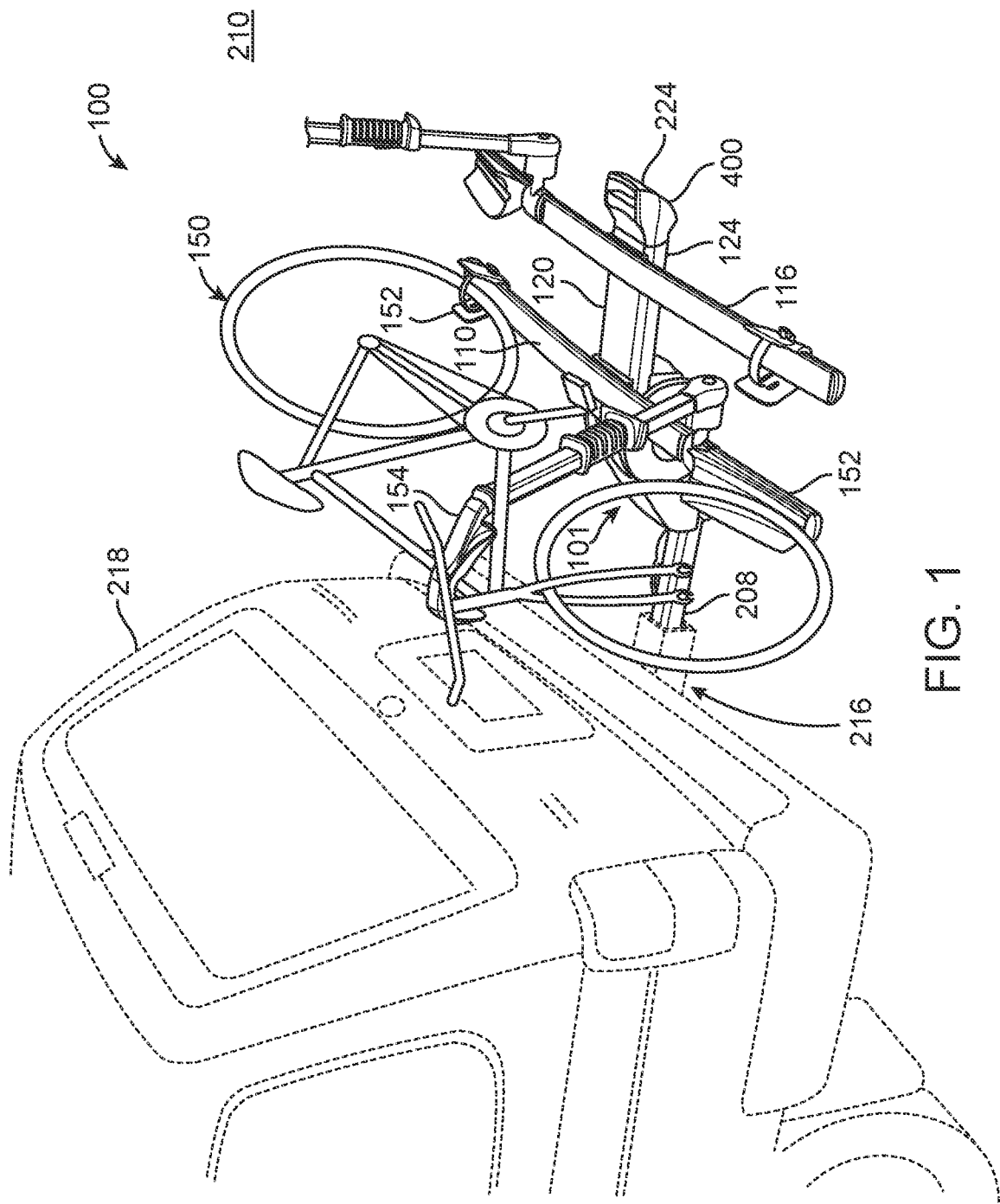
FIG. 1 is an isometric view of an example embodiment of a bicycle support arrangement having bicycle support bars in a two bicycle carrier arrangement.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. The description is not to be considered as limiting the scope of the implementations described herein. Descriptions and characteristics of embodiments within this disclosure not mutually exclusive.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder. The terms "comprising," "including" and "having" are used interchangeably in this disclosure. The terms "comprising," "including" and "having" mean to include, but not necessarily be limited to the things so described.

The present technology can be implemented as a vehicular rack support arrangement. For example, the vehicular rack support arrangement can be included as part of a bike mounting mechanism or other support equipment load carrier.

The present technology can include one or more of the features described herein. While some features are described in relation to a particular figure, the features can be implemented with other embodiments.

At least one example within the present technology is a bicycle support arrangement which can be configured to be coupled to a carrying vehicle. The bicycle support arrangement can include a bicycle support bar configured to be coupled to a rearwardly extending frame member of a vehicular mounted bicycle carrier. The bicycle support bar can include an elongate fastenable zone configured to be coupled at least one location along the elongate fastenable zone to the frame member. The bicycle support arrangement can further include a resiliently biased stop. The resiliently biased stop can be coupled to the bicycle support bar and transitionable between a deployed configuration and a retracted configuration. The resiliently biased stop can include an abutment portion located at an end boundary of the elongate fastenable zone of the bicycle support bar. The abutment portion can be configured to impede movement, in at least one direction, of the bicycle support bar relative to the rearwardly extending frame member of the vehicular mounted bicycle carrier in the deployed configuration of the resiliently biased stop.

In at least one example, the resiliently biased stop can also include a resilient intermediate portion coupled between the abutment portion and an anchored portion fixed relative to the bicycle support bar. In another example, the resilient intermediate portion of the resiliently biased stop is an elongate flexible extension extending between the abutment portion and the anchored portion of the resiliently biased stop. In another example, the resilient intermediate portion of the resiliently biased stop is a flexible band. In another example, the flexible band can include the resilient intermediate portion and the anchored portion of the resiliently biased stop. In yet another example, the flexible band can be a metal strip and the abutment portion of the resiliently biased stop can be comprised of a portion of the metal strip obliquely bent relative to a portion of the metal strip including the resilient intermediate portion of the resiliently biased stop.

In at least one example, the bicycle support bar can include a recess within which the resiliently biased stop can be anchored to the bicycle support bar.

In at least one example, the bicycle support bar can include a recess within which the resiliently biased stop can be located in the retracted configuration of the resiliently biased stop. In another example, the bicycle support bar can include a recess within which a majority of the resiliently biased stop can be located in the retracted configuration of the resiliently biased stop. In yet another example, a majority of the abutment portion of the resiliently biased stop can be located outside the recess in the deployed configuration of the resiliently biased stop.

In at least one example, the recess into the bicycle support bar forms an elongate track extending longitudinally along at least a portion of the bicycle support bar. In another example, the elongate track can be open ended and comprise a slot-opening into the track at an exterior of the bicycle support bar. In yet another example, the elongate track can be recessed into an underside of the bicycle support bar in an installed configuration of the bicycle support bar coupled to the rearwardly extending frame member of the vehicular mounted bicycle carrier.

In at least one example, an interior space of the elongate track can be at least partially cross-sectionally T-shaped.

In at least one example, a support bar leveling device can have a projection at least partially trapped within the elongate track of the bicycle support bar. In another example, the support bar leveling device can have a cross-sectionally T-shaped projection received within the elongate track of the bicycle support bar to facilitate translational motion of the support bar relative to the leveling device and resisting detachment of the bicycle support bar away from the leveling device.

In at least one example, the rearwardly extending frame member of a vehicular mounted bicycle carrier, upon which the support bar leveling device is fixed, can have a longitudinal axis oriented substantially perpendicular to a longitudinal axis of the bicycle support bar.

In at least one example, the resiliently biased stop is one of a pair of resiliently biased stops. Each of the resiliently biased stops can have an abutment portion and the two abutment portions are, one each, located at opposite end boundaries of the elongate fastenable zone. The elongate fastenable zone can therefore be delimited to between the two abutment portions. In yet another example, the bicycle support bar can be coupled to the frame member at a plurality of locations along the elongate fastenable zone. In yet another example, the bicycle support bar can be coupled to the frame member at any location along the elongate fastenable zone. The elongate fastenable zone can extend greater than four inches and less than twenty inches between the two abutment portions of the pair of resiliently biased stops.

In at least one example, a fastener can be configured to fix a relative position of the bicycle support bar relative to the frame member. The fastener can be a threaded bolt extending through the frame member and abutting the bicycle support bar.

In at least one example, the bicycle support arrangement can include at least one of a bicycle wheel securement and a bicycle frame securement coupled to the bicycle support bar for mounting a bicycle to the bicycle support bar in a substantially upright orientation.

At least one example within the present technology is a bicycle carrier which is convertible between a first configuration, in which one or more bicycles are accommodated, and a second extended configuration, in which one or more additional bicycles are accommodated for transport on a carrying vehicle. The bicycle carrier can include a vehicle engaging frame (such as, for example, a stinger element) configured to be mounted on a carrying vehicle, such as by insertion of the stinger within a hitch mount receiver attached to the vehicle. The bicycle carrier can also include an elongate rearward extending support member which is coupled to the frame at a proximate end of the support member by a variably configurable hub. The variably configurable hub can be capable of setting the support member in a plurality of orientations relative to the frame, in which the support member can accommodate one or more bicycles coupled to the bicycle carrier for transportation by the carrying vehicle. The bicycle carrier can additionally include a manual actuator which is operably coupled to the variably configurable hub by a linkage. The actuator can be actuable to enable the support member to be placed in various configurations. A distal end of the support member can be positioned away from the frame and configured to be alternately coupled to the actuator and to an add-on support member that accommodates one or more additional bicycles coupled to the bicycle carrier. In at least one example, a distal end of the linkage can be configured to be alternately coupled to the actuator and to a linkage extension of the add-on support member when the add-on support member is included in the bicycle carrier. Thus bicycle carrier can easily be adapted to carry additional bicycles.

At least one example within the technology is a cargo carrier for transporting one or more articles on a carrying vehicle. The load carrier can include a vehicle engaging frame. The engaging frame can be configured to be mounted on a carrying vehicle. The cargo carrier can also include an elongate rearward extending support member which is coupled to the frame at a proximate end of the support member by a variably configurable hub capable of setting the support member in a plurality of orientations relative to the frame. At least one setting of the hub can establish a cargo carrying in which a longitudinal axis of the support member is inclined at an angle of at least three degrees above horizontal. At least one additional setting of the of the hub can establish a cargo loading configuration, in which the longitudinal axis of the support member is declined at an angle of at least fifteen degrees below horizontal. It will be understood that other settings and relative angles are possible and fall within this disclosure.

In at least one example, a cargo carrier can comprise a squaring arrangement for leveling a cargo load mounted on the cargo carrier in the cargo carrying configuration. The squaring arrangement can include a leveling device which is coupled between the elongate rearward extending support member and a load support member. In the cargo carrying configuration the leveling device can have an inclined surface at least partially abuttingly engaging the inclined support member, and a substantially horizontal oriented surface at least partially abuttingly engaging the load support member, which thereby substantially horizontally orients the load support member.

At least one example within the technology is a hitch-mount bicycle carrier which is convertible between a first configuration in which one or more bicycles are accommodated, and a second configuration, in which one or more additional bicycles are accommodated for transport on a carrying vehicle. The hitch-mount bicycle carrier can include a stinger configured to be insertably received in a hitch receiver mounted on a carrying vehicle. The carrier can have an installed orientation which is established when the stinger is secured in the hitch receiver, thereby orienting the stinger in a substantially horizontal orientation. The carrier can further include an elongate rearward extending support member coupled to the stinger at a proximate end of the support member by a variably configurable hub capable of setting the support member in a plurality of orientations relative to the stinger, in which the support member accommodates a first set of bicycle's being coupled thereto. The carrier can also include a manual actuator which is operably coupled to the variably configurable hub by a linkage that is at least partially housed within the support member. A distal end of the support member can be positioned away from the stinger and can be configured to be alternately coupled to the actuator as well as an add-on support member that accommodates a second set of bicycle's being coupled thereto. Thus the number of bicycles which can be transported can be varied depending on the needs of the user.

At least one example within the technology is a leveling arrangement for positioning a bicycle mounted on a bicycle carrier in a substantially vertical orientation when in a bicycle carrying configuration. A leveling arrangement can include a leveling device in a bicycle carrying configuration which has an inclined surface configured to at least partially abuttingly engage an inclined support member of the bicycle carrier. The leveling device can have a substantially horizontal oriented surface configured to receive a bicycle support and configured to position the bicycle support in a substantially horizontal orientation so that a bicycle mounted to the bicycle support is substantially vertically oriented. The substantially vertical orientation of can thus establish a bicycle carrying configuration of the carrier.

FIG. 1 illustrates an example embodiment of a bicycle support arrangement 100 having a set bicycle support bars 110. The bicycle support arrangement 100 can include a bicycle support bar 110 coupled to a rearwardly extending frame member 120 of a hitch-mount bicycle rack 200. The hitch-mount bicycle rack 200 can detachably couple to a carrier vehicle 218 via a stinger 208 which is receivable within a hitch receiver 216 of a carrying vehicle 218. The rearwardly extending frame member 120 can be coupled to a variably configurable hub 222 at a proximal end 122 and can include a manual actuator 224 coupled at a distal end 124 of the rearwardly extending frame member 120.

Figure 2:
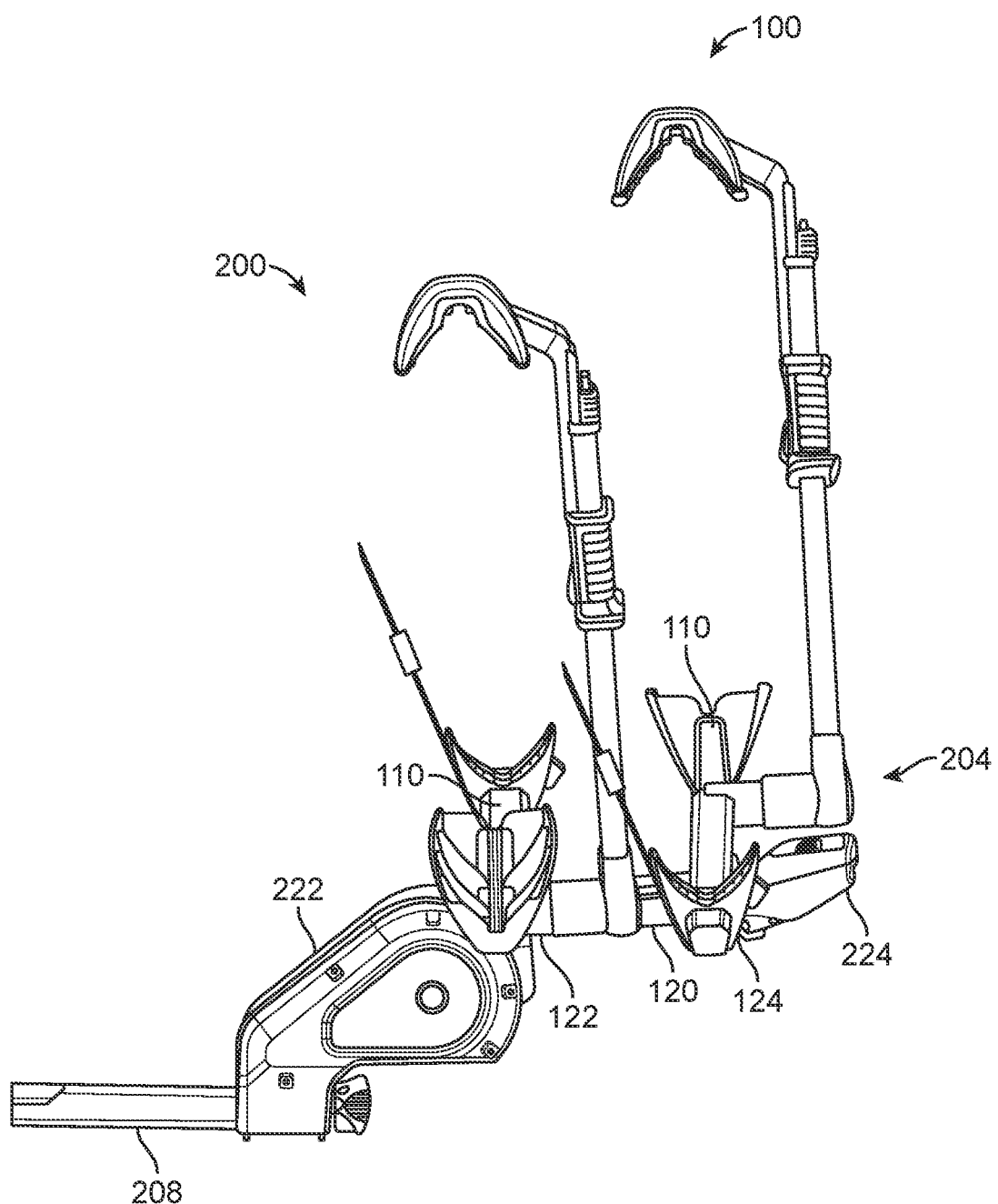
FIG. 2 is a side, plan view of the bicycle support arrangement of FIG. 1 in a deployed configuration.

FIGS. 1 and 2 illustrate a hitch-mount bicycle rack 200 in a bicycle carrying configuration 264 in which a bicycle 150 can rest on a support bar 110 in a substantially vertical, upright orientation.

In at least one example, rearwardly extending frame member 120 is modular, such that the manual actuator 224 can be decoupled from the distal end 124 of the rearwardly extending frame member 120 and an add-on frame member 126 can be coupled to the distal end 124 of rearwardly extending frame member 120. The manual actuator 224 can then be coupled to a distal end 128 of the add-on frame member 126. The add-on frame member 126 can allow the bicycle support arrangement 100 to hold a plurality of sets of bicycles. The manual actuator 224 can include a foot 400. The foot 400 can be configured to contact the ground (or other surface) while allowing the manual actuator 224 enough clearance to be operably utilized. In at least one example, the foot 400 is configured to allow an operator to comfortably fit a hand around the manual actuator 224 without the operator's hand touching the ground.

The bicycle carrier support arrangement 100 can include at least one of a bicycle wheel securement 152 and a bicycle frame securement 154 coupled to the bicycle support bar 110.

In at least one example, the bicycle wheel securement 152 can be a bicycle wheel tray. The bicycle wheel tray can optionally include a securement strap. In at least one example, the securement strap can be secured into a ratcheting mechanism. In another example, the bicycle wheel securement 152 can be an adjustable rotatable arm configured to secure the wheel. In at least one example, the rotatable arm can have a substantially U-shaped distal end configured to fit over the bicycle wheel and configured to secure the bicycle wheel. In at least one example, the bicycle frame securement 154 can be an adjustable rotatable arm having a substantially U-shaped distal end and configured to secure the frame.

FIG. 2 illustrates the bicycle support arrangement can be in one setting 260 having a frame member 120 with an angle of inclination 268. The bicycle support bar 110 can be orientated in a substantially leveled orientation of support 302 compensating for the angle of inclination 268.

Figure 3:
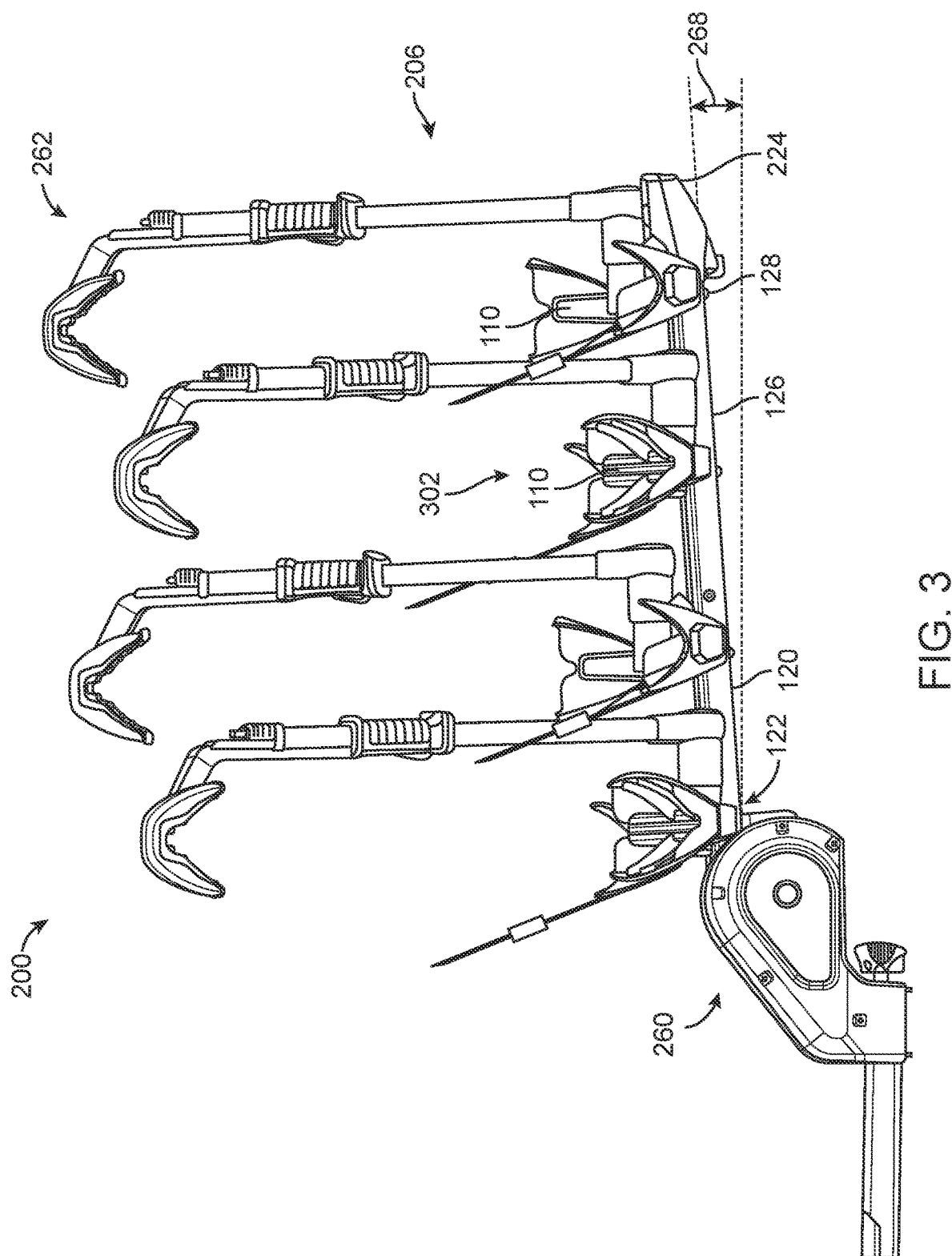
FIG. 3 is a side, plan view of another example embodiment of a bicycle support arrangement having bicycle support bars in a four bicycle carrier arrangement in a deployed configuration.

FIG. 3 illustrates a hitch-mount bicycle rack 200 in a second configuration 206. The hitch-mount bicycle rack 200 is in bicycle carrying configuration 264, as in FIGS. 1 and 2, however, an add-on frame 126 is connected to the rearwardly extending frame member 120. As illustrated, add-on frame 126 can support additional bicycle supports 110, thus enabling a carrying vehicle (not shown) to transport additional bicycles. The manual actuator 224 is connected to the distal end 128 of the add-on frame 126. In the bicycle carrying configuration 264, variably configurable hub 222 establishes the rearwardly facing frame member 120 at an angle of inclination 268 relative to the horizontal 270.

Figure 4:
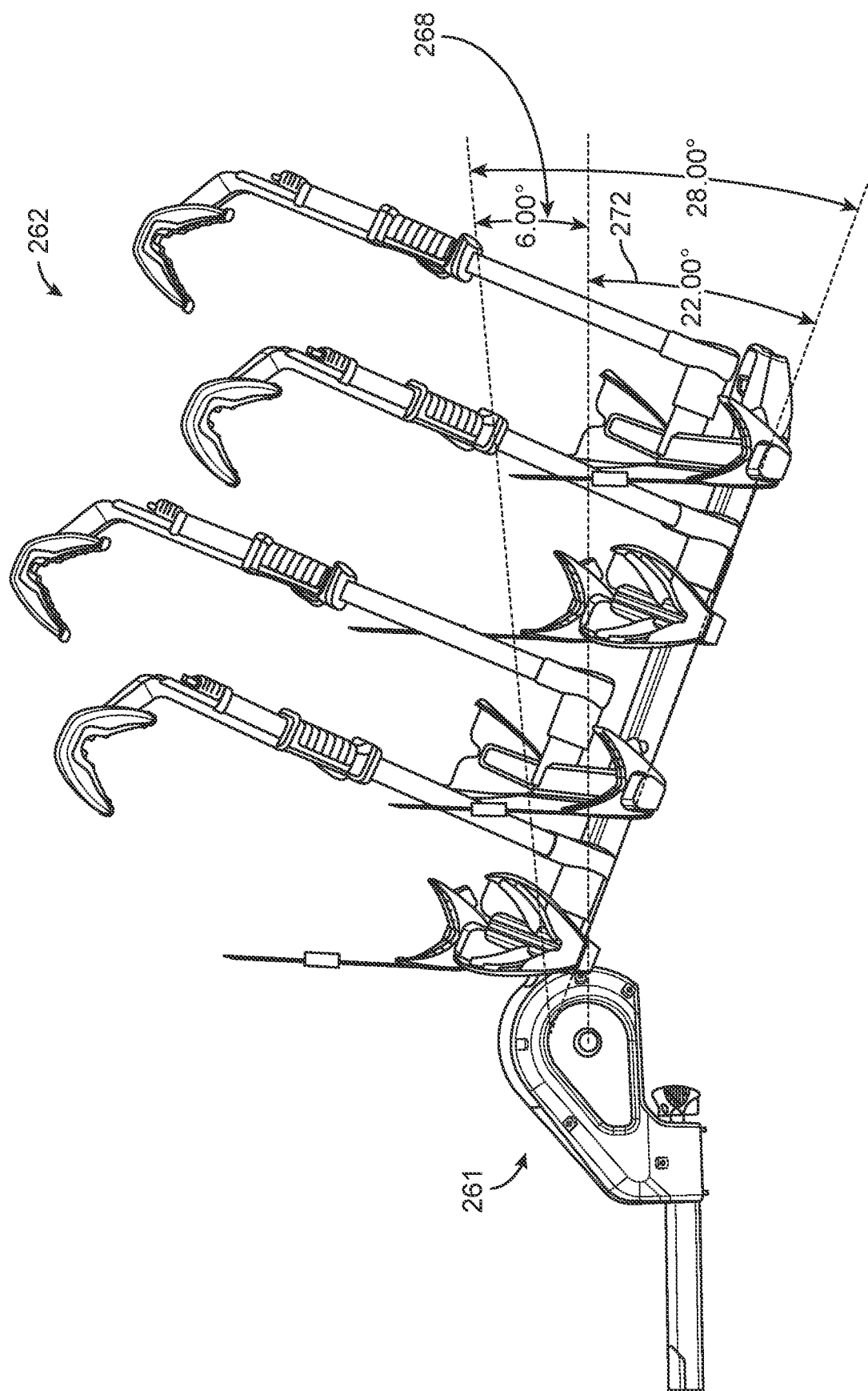
FIG. 4 is a side, plan view of the bicycle support arrangement of FIG. 3 in a loading configuration.

FIG. 4 illustrates a hitch-mount bicycle rack 200 in a bicycle loading configuration 262. The bicycle loading configuration 262 can be associated with the variably configurable hub in a second setting 261. As in FIG. 3, the hitch-mount bicycle rack 200 is in the second configuration 206 having an add-on frame 126 connected to the rearwardly extending frame member 120. In the bicycle loading configuration 262, variably configurable hub 222 establishes the rearwardly facing frame member 120 at an angle of declination 272 relative to the horizontal 270.

Figure 5:
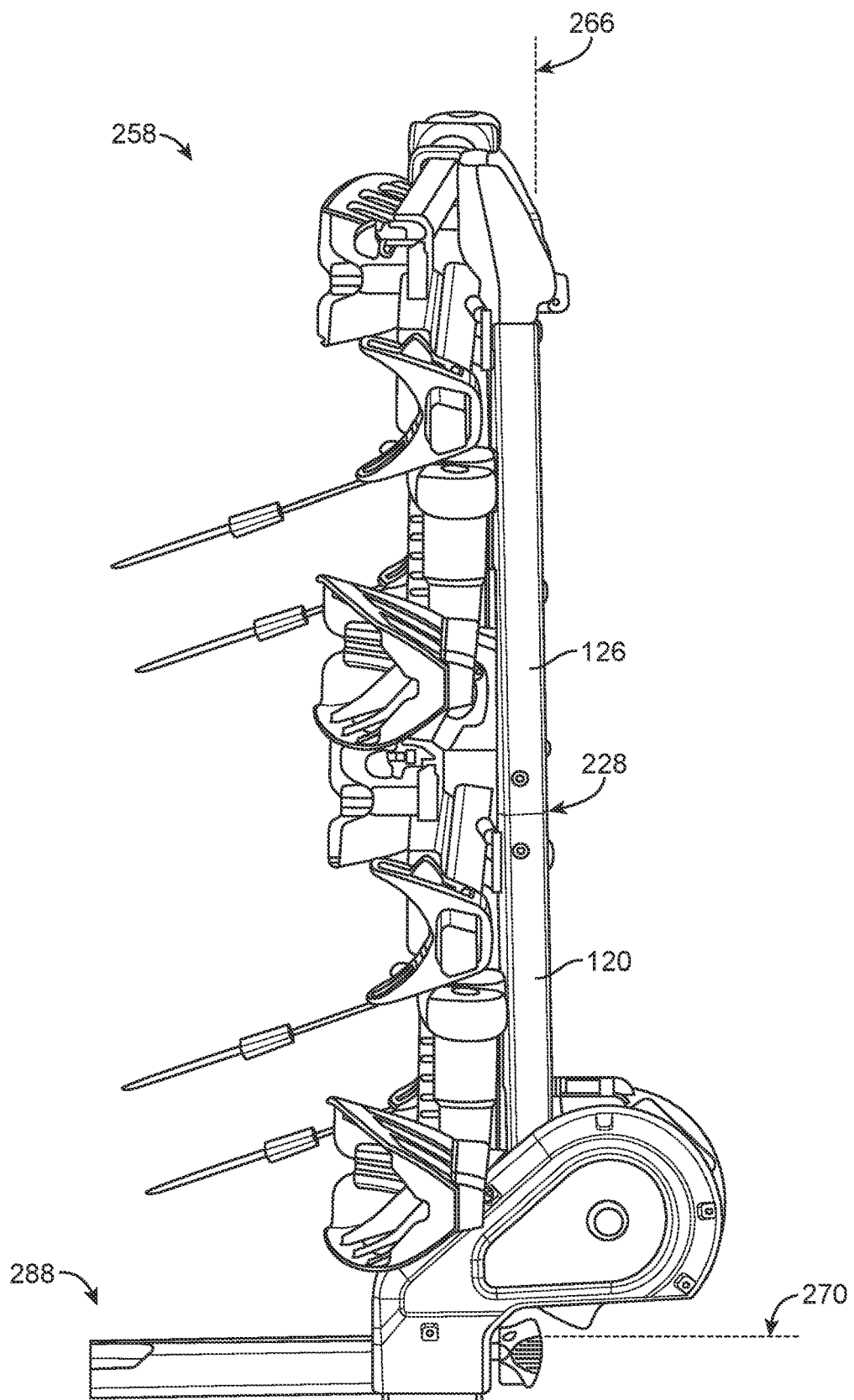
FIG. 5 is a side, plan view of the bicycle support arrangement of FIG. 3 in an undeployed configuration.

FIG. 5 illustrates a hitch-mount bicycle rack 200 in an empty configuration 258. As in FIGS. 3 and 4, the hitch-mount bicycle rack 200 is in the second configuration 206 having an add-on frame 126 connected to at the distal end 128 of the rearwardly extending frame member 120. In the empty configuration 258, the rearwardly extending frame member 120 is upstanding relative to the stinger 208. The frame member 120 is substantially perpendicular to the stinger 208 forming a substantially right angle.

Figure 6:
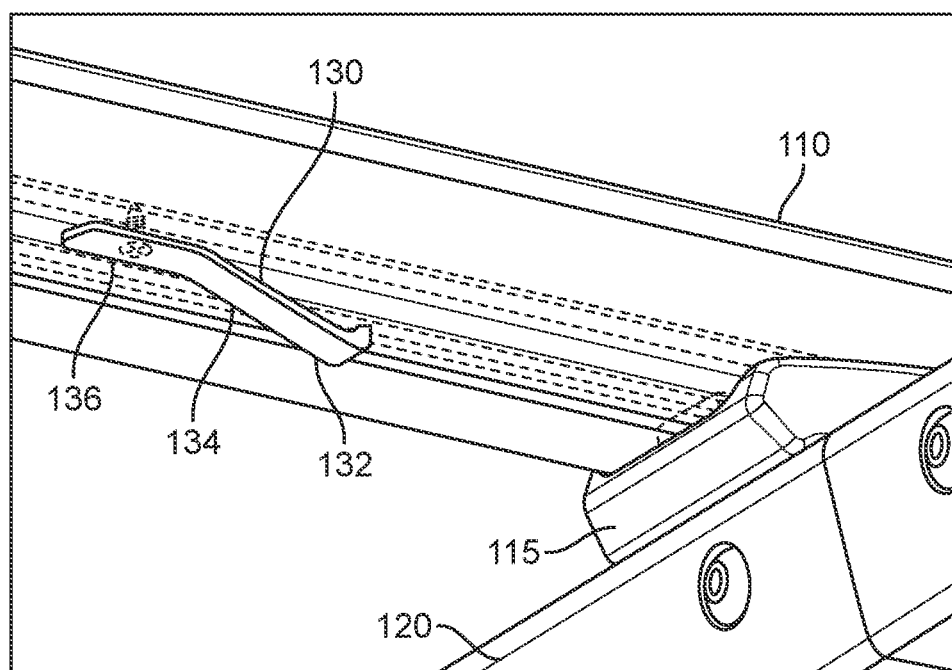
FIG. 6 is elevational view of an underside of the bicycle support bar having a resiliently biased stop.

FIG. 6 illustrates a resiliently biased stop 130 coupled to a bicycle support bar 110. The resiliently biased stop 130 can have an abutment portion 132 configured to be an end boundary of an elongate fastenable zone. The resiliently biased clip can also have an anchored portion 136. The anchored portion 136 can secure the resiliently biased stop 130 to the bicycle support bar 110. As may be appreciated in FIG. 6, the anchored portion 136 can be secured by a screw. In another example, the anchored portion 136 can be secured by a nail, push fastener, bolt, or any known securing mechanism. The resiliently biased stop 130 can further include an intermediate portion 134 coupled between the abutment portion 132 and the anchored portion 136. The intermediate portion can be an elongate extension extending between the abutment portion 132 and the anchored portion 136. In at least one example, the intermediate portion can be configured to allow the resiliently biased stop 130 to transition between a retracted configuration and an extended configuration.

Figure 7:
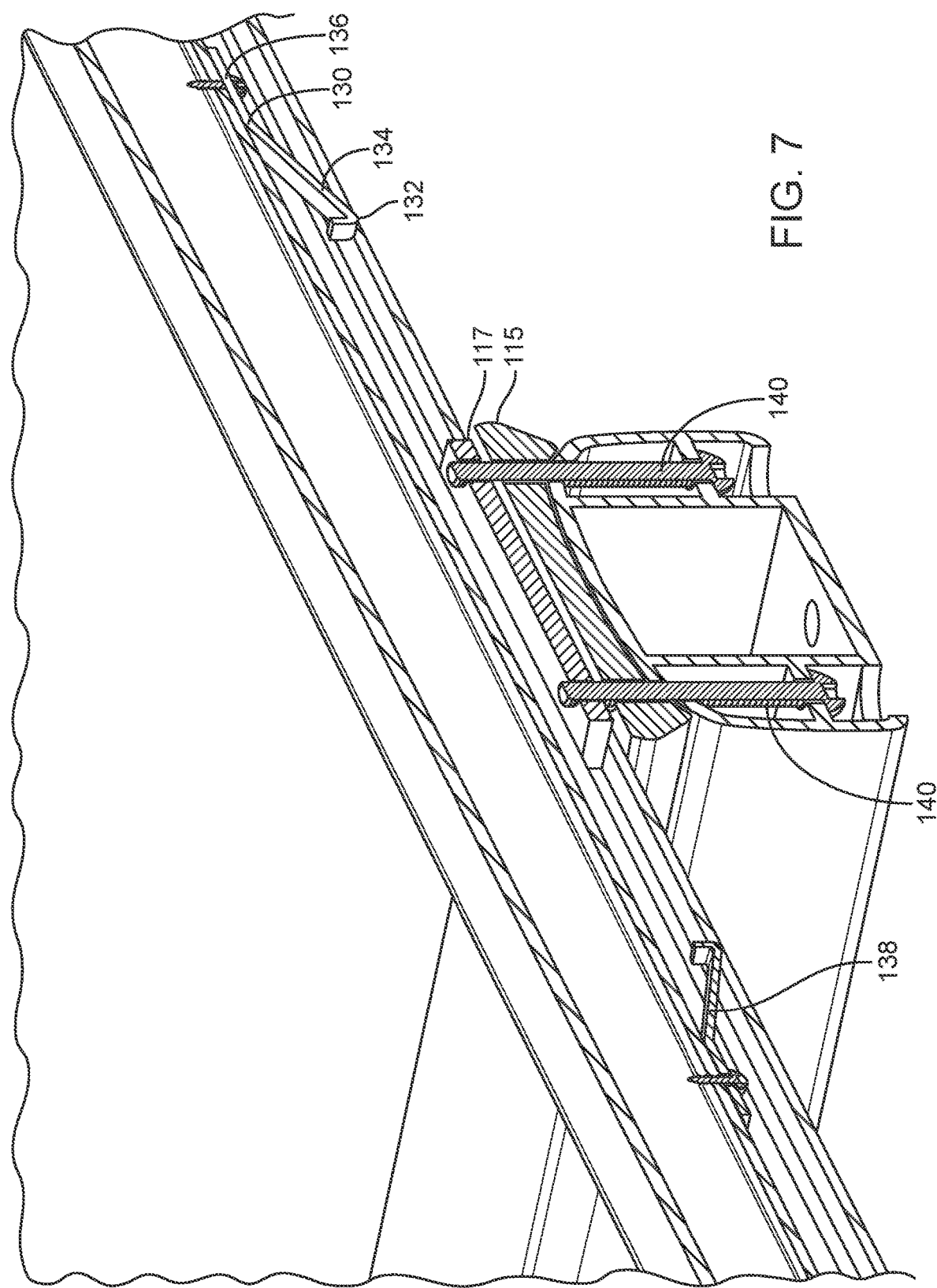
FIG. 7 is an elevational, lateral cross-sectional view of a frame member and the bicycle support bar.
Figure 8:
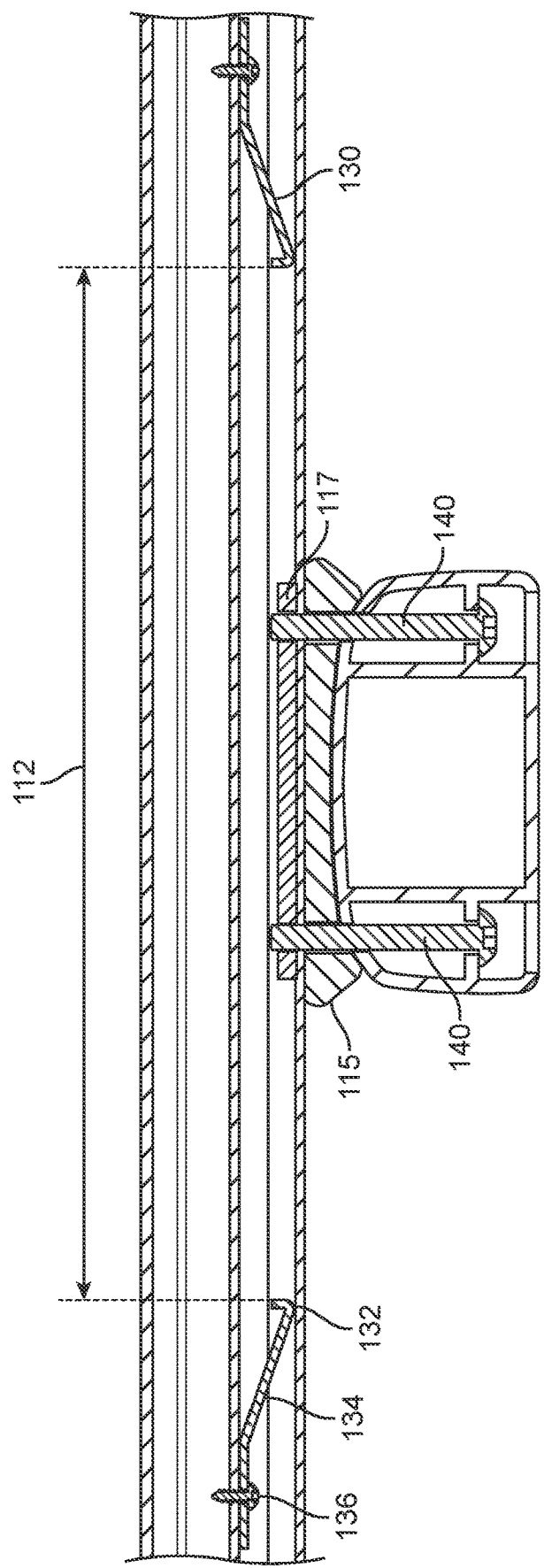
FIG. 8 is a plan, cross-sectional view of FIG. 7.

FIGS. 7 and 8 are lateral cross-sectional views of the rearwardly extending frame member 120 and the bicycle support bar 110. The bicycle support bar 110 can include an elongate fastenable zone 112 configured to be coupled at least one location along the elongate fastenable zone 112 to the frame member 120. The elongate fastenable zone 112 can be a portion of the bicycle support bar 110 configured to be coupled to the rearwardly extending frame member 120. The elongate fastenable zone 112 can extend greater than four inches and less than twenty inches. In at least one example, the elongate fastenable zone can be six inches.

The bicycle support bar 110 can include a resiliently biased stop 130. The resiliently biased stop 130 can be transitionable between a deployed configuration and a retracted configuration. The resiliently biased stop 130 can have an abutment portion 132 configured to impeded movement, in at least one direction, of the bicycle support bar 110. The abutment portion can be located at an end boundary of the elongate fastenable zone 112.

In the retracted configuration the bicycle support bar 110 having the resiliently biased stop 130 can be slidably installed on the rearwardly facing frame member 120. The resiliently biased stop 130 can then be transitioned to the deployed configuration, thus forming the end boundary of the elongate fastenable zone 112.

As may be appreciated in FIGS. 7 and 8, the bicycle support arrangement 100 can include a pair resiliently biased stops 130. The pair of resiliently biased stops 130 can each have an abutment portion 132. The pair of abutment portions 132 can be, one each, located at opposite end boundaries of the elongate fastenable zone 112 thereby delimiting the elongate fastenable zone 112 between the two abutment portions 132.

In an alternative example, the bicycle support arrangement 100 can include a single resiliently biased stop 130. In this arrangement, the support bar 110 can include a stopping mechanism configured to bound the opposite end boundary of the elongate fastenable zone.

The resiliently biased stop 130 can further include a resilient intermediate portion 134 coupled between the abutment portion 132 and an anchored portion 136. The anchored portion 136 can fix the resiliently biased stop 130 relative to the bicycle support bar 110. The anchor can be any securement mechanism including, but not limited to, a screw, nail, push type fastener, or any other fastener capable of anchoring the anchored portion 136 of the resiliently biased stop 130 to the bicycle support bar 110. In at least one example, the anchor can be a screw.

The resilient intermediate portion 134 of the resiliently biased stop 130 can be an elongate flexible extension extending between the abutment portion 132 and the anchored portion 136. The resilient intermediate portion 134 can be a flexible band 138. Alternatively, the flexible band 138 can include the resilient intermediate portion 134 and the anchored portion 136. In at least one example, the flexible band 138 can be a metal strip and the abutment portion 132 of the resiliently biased stop 130 can be a portion of the metal strip obliquely bent relative to a portion of the metal strip comprising intermediate portion 134 of the resiliently biased stop 130.

Figure 9:
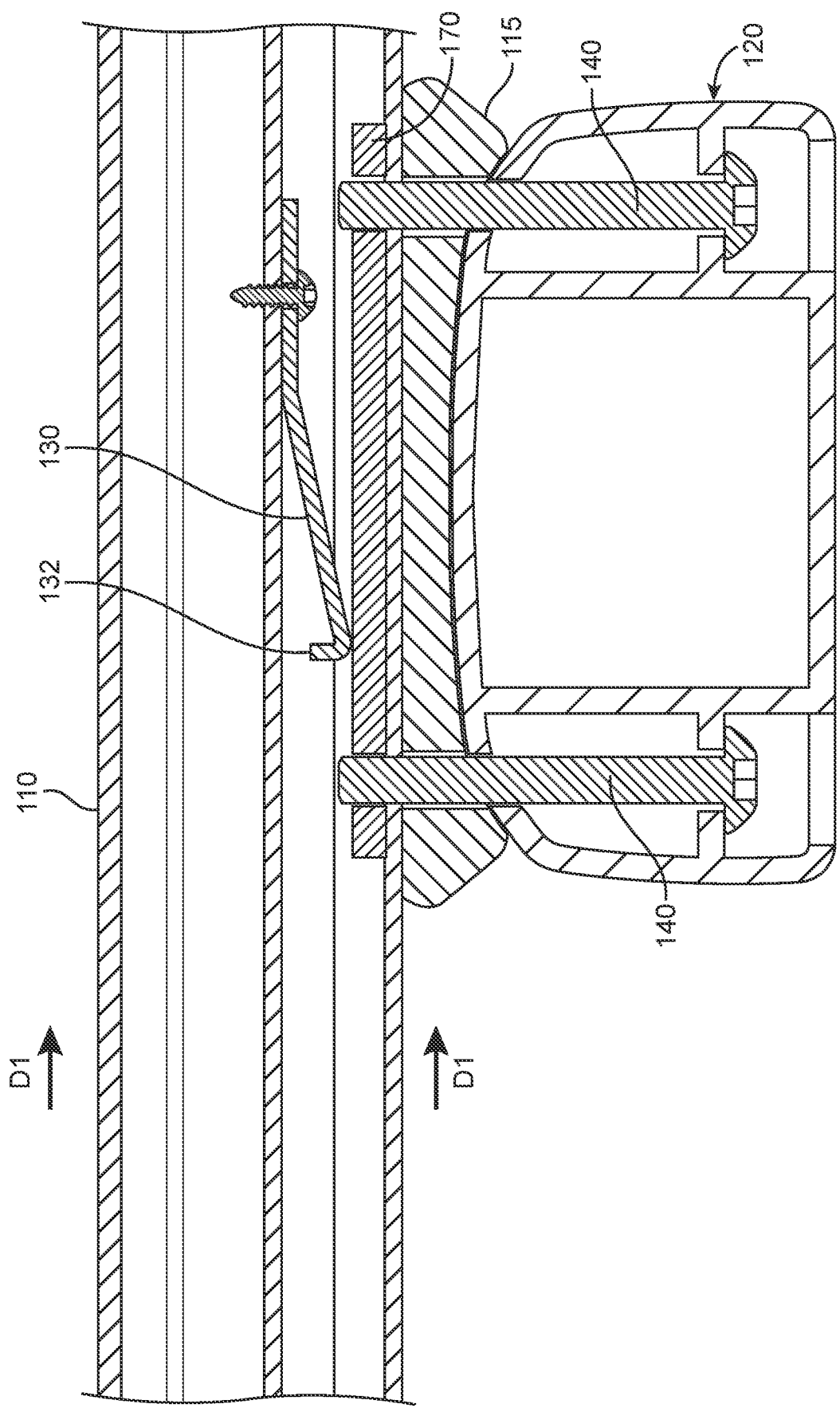
FIG. 9 is a lateral cross-sectional view of a frame member having a resiliently biased stop in a retracted configuration.

FIG. 9 illustrates a bicycle support bar 110 being installed/uninstalled upon a bicycle support arrangement and having a resiliently biased stop 130 in a retracted configuration. The resiliently biased stop 130 can be configured impede motion in at least one direction. In at least one example, during motion in the opposite direction the resiliently biased stop 130 can be configured to retract at least partially within the bicycle support bar 110. The retraction of the resiliently biased stop 130 can allow for the bicycle support bar to be installed onto or uninstalled from the rearwardly extending frame member 120. During installation, the resiliently biased stop 130 retracts into a recess of the bicycle support bar 110. As may be appreciated in FIG. 9, the retraction of the resiliently biased stop 130 allows the resiliently biased stop 130 to pass over a projection 170 when the bicycle support bar 110 being installed upon a bicycle support arrangement.

Figure 10:
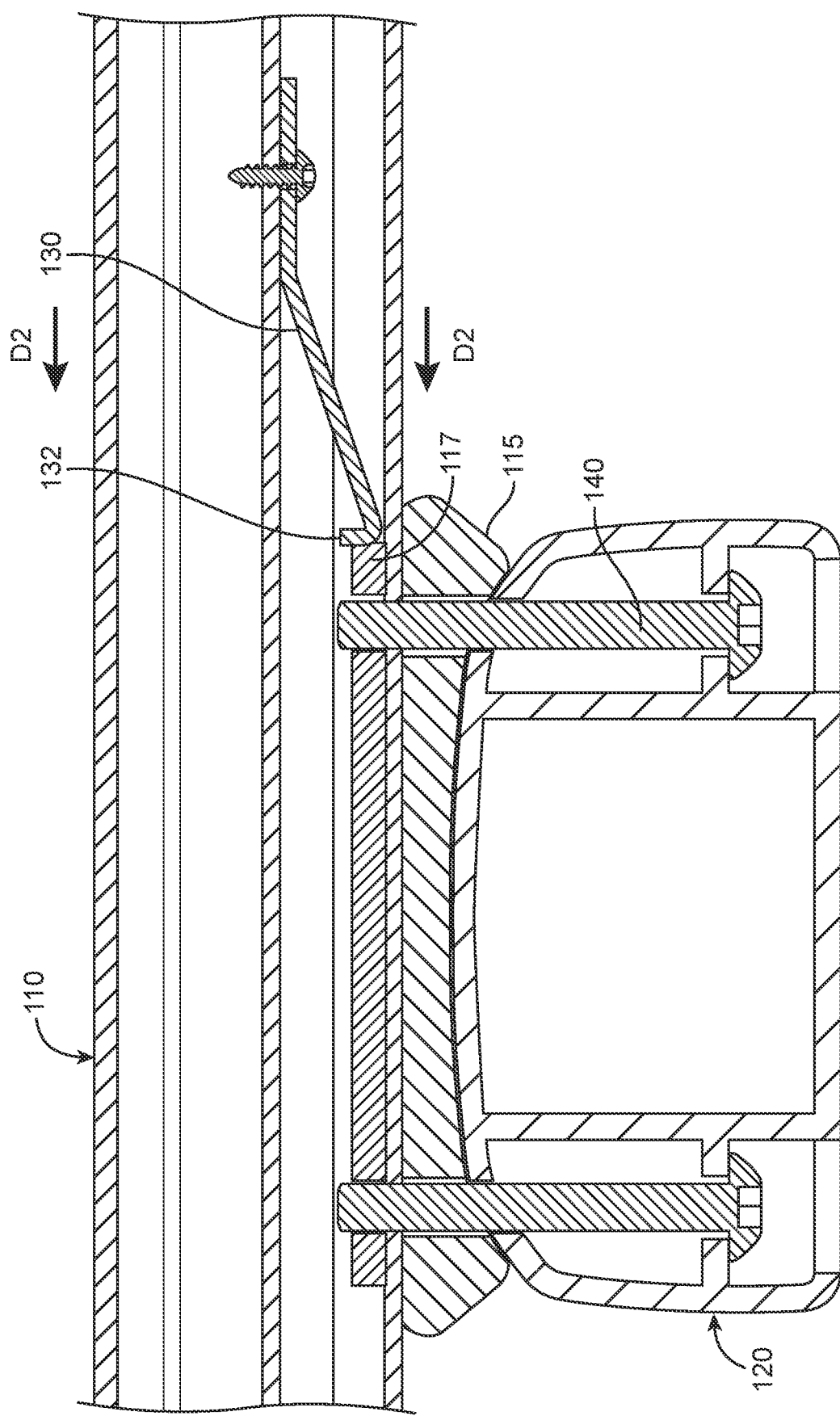
FIG. 10 is a lateral cross-sectional view of a frame member having a resiliently biased stop in a deployed configuration.

FIG. 10 illustrates a bicycle support bar 110 in an installed configuration upon a bicycle support arrangement and having a resiliently biased stop 130 in a deployed configuration. The resiliently biased stop 130 can have an abutment portion 132 configured to impede movement in at least one direction. The abutment portion 132 can be configured to contact a projection 117 thereby impeding movement of the bicycle support 110 relative to the rearwardly extending frame member 120. As may be appreciated in FIG. 10, as the bicycle support bar travels in the direction indicated, the abutment portion 132 of the resiliently biased stop 130 contacts the projection 117 thereby impeding movement of the bicycle support bar 110.

Figure 11:
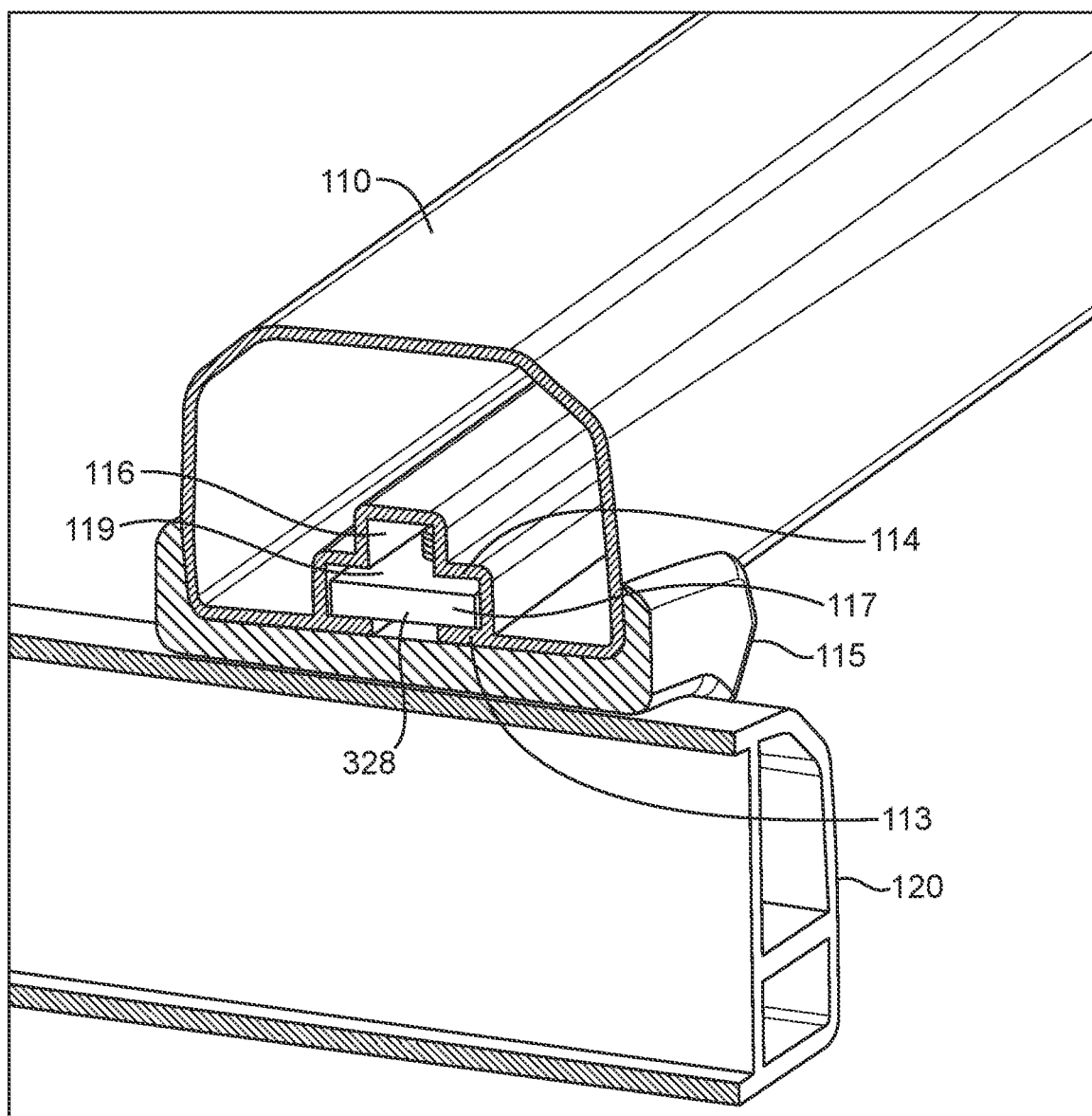
FIG. 11 is an elevational, longitudinal cross-section view of the frame member and the bicycle support bar.
Figure 12:
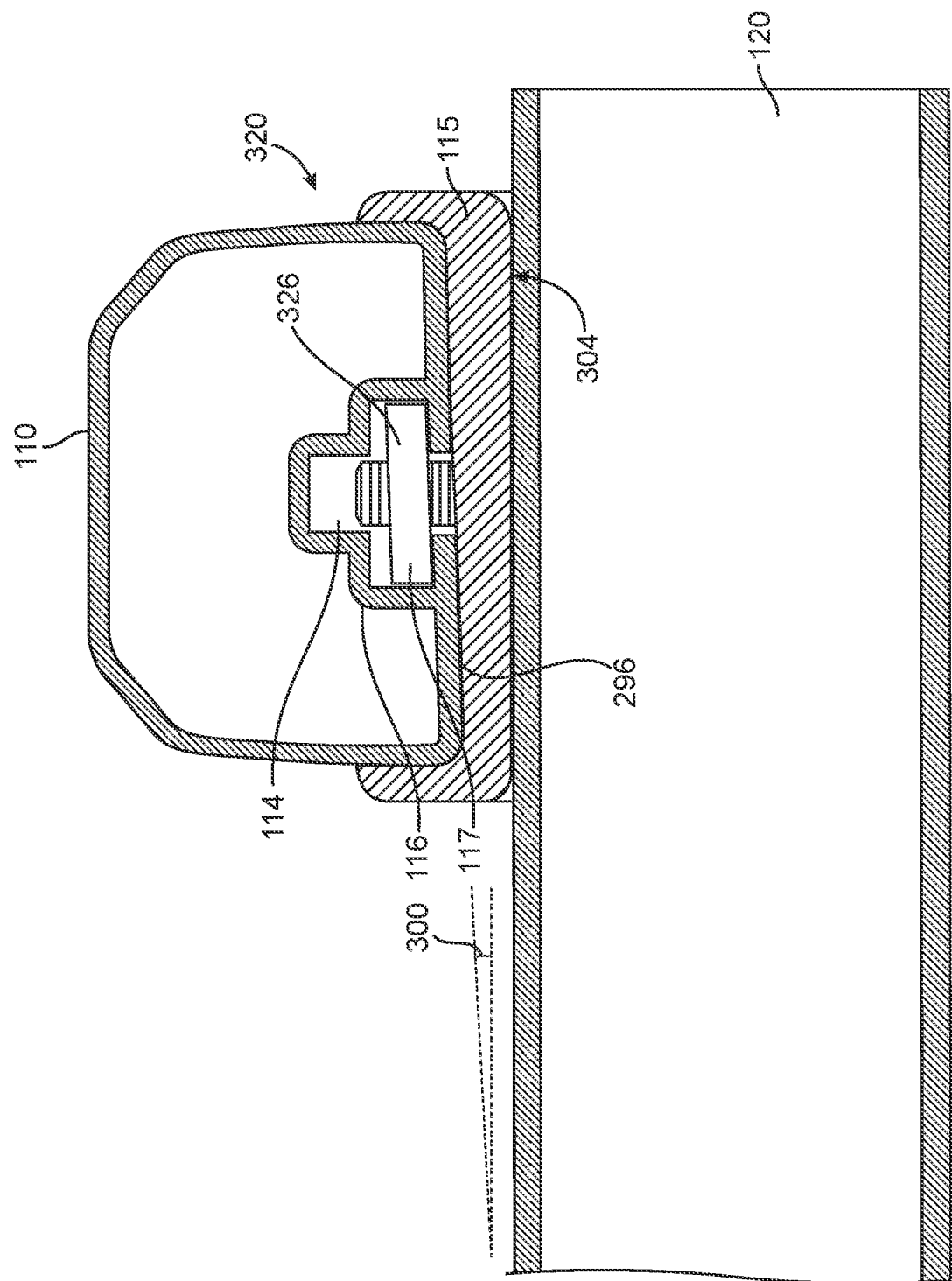
FIG. 12 is a plan, cross-sectional view of FIG. 11.

FIGS. 11 and 12 illustrate longitudinal cross-section views of the frame member 120 having a bicycle support bar 110 installed thereon. The bicycle support bar 110 can further include a recess 114. The recess 114 can be in an underside 111 of the bicycle support bar. The resiliently biased stop 130 can be anchored to the bicycle support bar within the recess 114.

In at least one example, the resiliently biased stop 130 can be within the recess 114 when in the retracted configuration. Alternatively, a majority of the resiliently biased stop 130 can be within the recess when in the retracted configuration (see FIG. 10). In at least one example, a majority of the abutment portion 132 of the resiliently biased stop 130 can be located outside the recess 114 in the deployed configuration.

The recess 114 of the bicycle support bar 110 can form an elongate track 116 extending longitudinally along at least a portion of the bicycle support bar. The elongate track 116 can include at least one lip 113 configured to secure the projection at least partially within the elongate track. As illustrated in FIG. 11, the elongate track 116 can extend the length of the bicycle support bar 110 and have a pair of resiliently biased stops 130 to bound the elongate fastenable zone 112.

The elongate track 116 can alternatively extend along only a portion of the track. The end of the track can be configured to serve as a stopping mechanism and impede movement of the bicycle support bar 110 relative to the rearwardly extending frame member 120. In at least one example, the elongate fastenable zone 112 can be bounded by the resiliently biased stop 130 and the end of the track.

The elongate track 116 can take many forms. In at least one example, the elongate track 116 can have a substantially T-shaped cross-section. In another example, the elongate track 116 can have a substantially rectangular shaped cross-section.

The elongate track 116 can be open ended and include a slot-opening 118 into the elongate track 116 at an exterior of the bicycle support bar. In at least one example, the slot opening 118 can be at either end of the bicycle support bar. In another example, the bicycle support bar 110 can have a pair of slot-openings 118 at opposite ends of the bicycle support bar 110. In yet another example, the slot opening 118 can be on the side of the bicycle support bar 110.

The bicycle support arrangement can further include a leveling device 115. The leveling device 115 can be configured to receive the bicycle support bar 110 when the bicycle support bar 110 is installed on the rearwardly extending frame member 120. The leveling device 115 can be positioned between the rearwardly extending frame member 120 and the bicycle support bar 110. The leveling device 115 can be configured to have a non-uniform thickness across the width of the bicycle support bar. The non-uniform thickness of the leveling device 115 can be configured to reduce the angle of the bicycle support bar 110 caused by the inclination of the rearwardly extending frame member 120 when in a bicycle carrying configuration. The non-uniform thickness of the leveling device 115 is configured to allow bicycles to remain substantially vertical in the inclined bicycle carrying configuration. In at least one example, the leveling device 115 can have substantially U-shaped upper surface configured to cradle bicycle support bar 110. In an alternative example, the leveling device 115 can have a substantially flat upper surface configured to receive bicycle support bar 110.

The leveling device 115 can include and operably communicate with a projection 117 at least partially trapped within the elongate track 116 of the bicycle support bar 110. The projection 117 can be configured to be trapped within the elongate track 116 of the bicycle support bar 110. In at least one example, the projection 117 can be inserted through the slot-opening 118 and positioned in the elongate fastenable zone 112. In at least one example, the leveling device can include an elongate T-nut 328. As may be appreciated in FIG. 12, the cross-section 326 of projection 117 can be T-shaped. The elongate T-nut can be configured to secure the leveling device to the bicycle support bar 110. The cross-section 320 of the leveling device 115 illustrates the horizontal oriented surface 296 of the leveling device 115 and the bottom side 304 of the leveling device 115.

In the bicycle carrying configuration, the projection 117 is partially trapped within the elongate track 116 of the bicycle support bar 110. The projection 117 can be positioned within the elongate fastenable zone 112. A fastener 140 can be configured to secure the projection 117 and leveling device 115 to the bicycle support bar 110. The fastener 140 can be a bolt, screw, clamp, or any other suitable releasable securement mechanism. In at least one example, the bicycle carrier support arrangement 100 includes a pair of fasteners 140.

The fastener 140 can be configured to be loosened allowing the bicycle support 110 to be repositioned. The bicycle support bar 110 can move laterally with respect to the rearwardly facing frame member 120 and the projection 117 can travel within the elongate track 116 and within the elongate fastenable zone 112. The fastener can be tightened to secure the bicycle support bar 110 in position. The projection 117 being received in the elongate track 116 resists detachment of the bicycle support bar from the leveling device 115.

As may be appreciated in FIGS. 7 and 11, the longitudinal axis of the bicycle support bar 110 can be oriented substantially perpendicular to the longitudinal axis of the rearwardly extending frame member 120.

Figure 13:
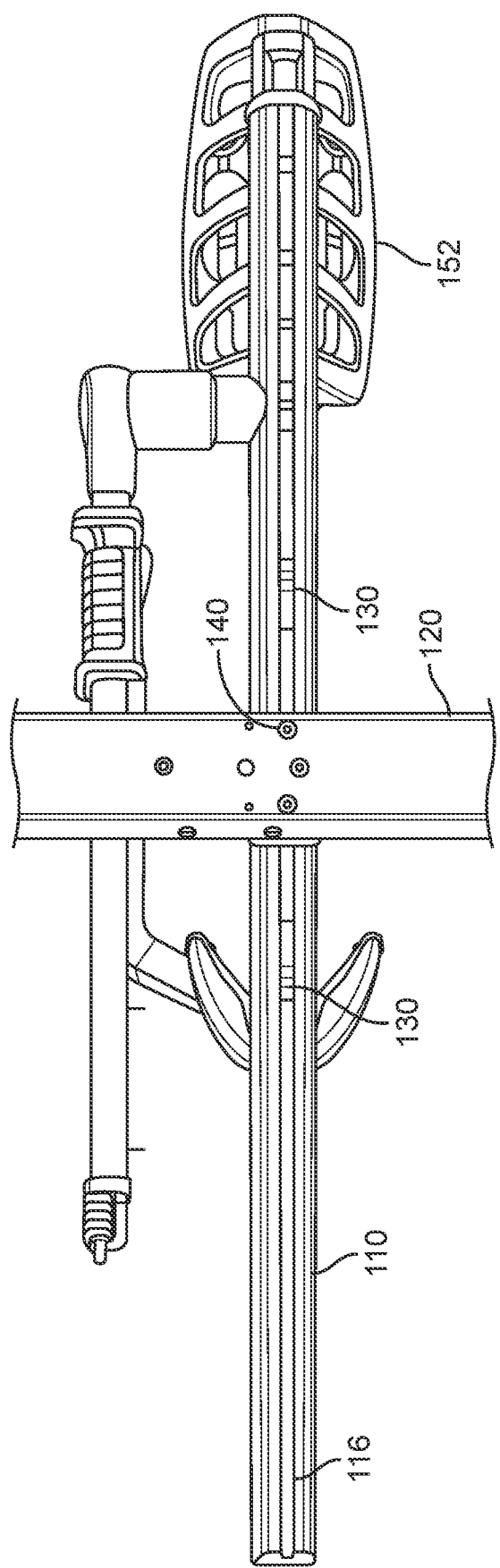
FIG. 13 is a bottom view of a bicycle support bar coupled to a frame member.

FIG. 13 illustrates an underside view of a bicycle support 110 atop a rearwardly extending frame member 120. Also visible, is an underside of a bicycle wheel securement 152, which is configured to receive a bicycle wheel therein. As shown, bicycle support 110 can include an elongate track 116 which runs along the length of the support 110. The elongate track 116 can be configured to slide over a projection of a leveling device (not shown) on the opposite side of the frame member 120. The leveling device can be held in place by one or more fasteners 140 which run through the frame member 120 and connect to the projection of the leveling device. Within the elongate track 116 can be at least one resiliently biased stop 130. The resiliently biased stop 130 can be configured such it will pass over the projection in only one direction when the support 110 is slid over the projection along the elongate track 116 during installation of the support 110 onto the frame member 120.

Figure 14:
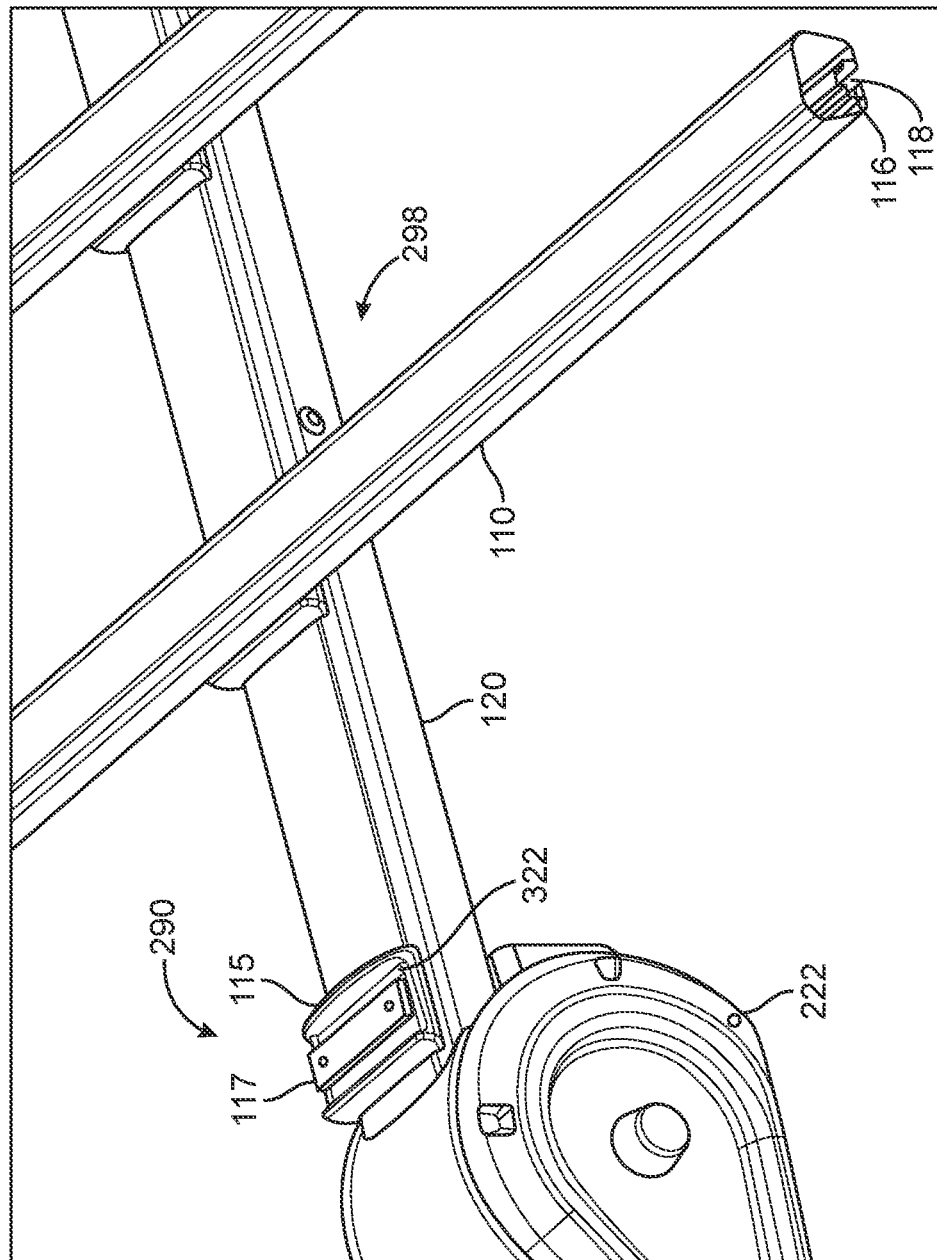
FIG. 14 is an elevational view of a frame member showing a leveling device without a bicycle support bar installed thereon.

FIG. 14 illustrates the bicycle support arrangement can further include a leveling device 115 configured to receive the bicycle support bar 110 when the bicycle support bar 110 is installed on the rearwardly extending frame member 120. The leveling device 115 can be positioned between the rearwardly extending frame member 120 and the bicycle support bar 110. The leveling device 115 can operably communicate with a projection 117 at least partially trapped within the elongate track 116 of the bicycle support bar 110. The projection 117 can be configured to be trapped within the elongate track 116 of the bicycle support bar 110 by inserting the projection 117 through the slot-opening 118. The leveling device can have a squaring arrangement 290. The squaring arrangement 290 can be configured to establish a bicycle support bar 110 in a leveled orientation 298. The leveling device 115 can include an elongate trough 322 configured to cradle the bicycle support bar 110. In at least on example, the elongate trough 322 can cause the leveling device 115 to take a substantially U-shaped.

Figure 15:
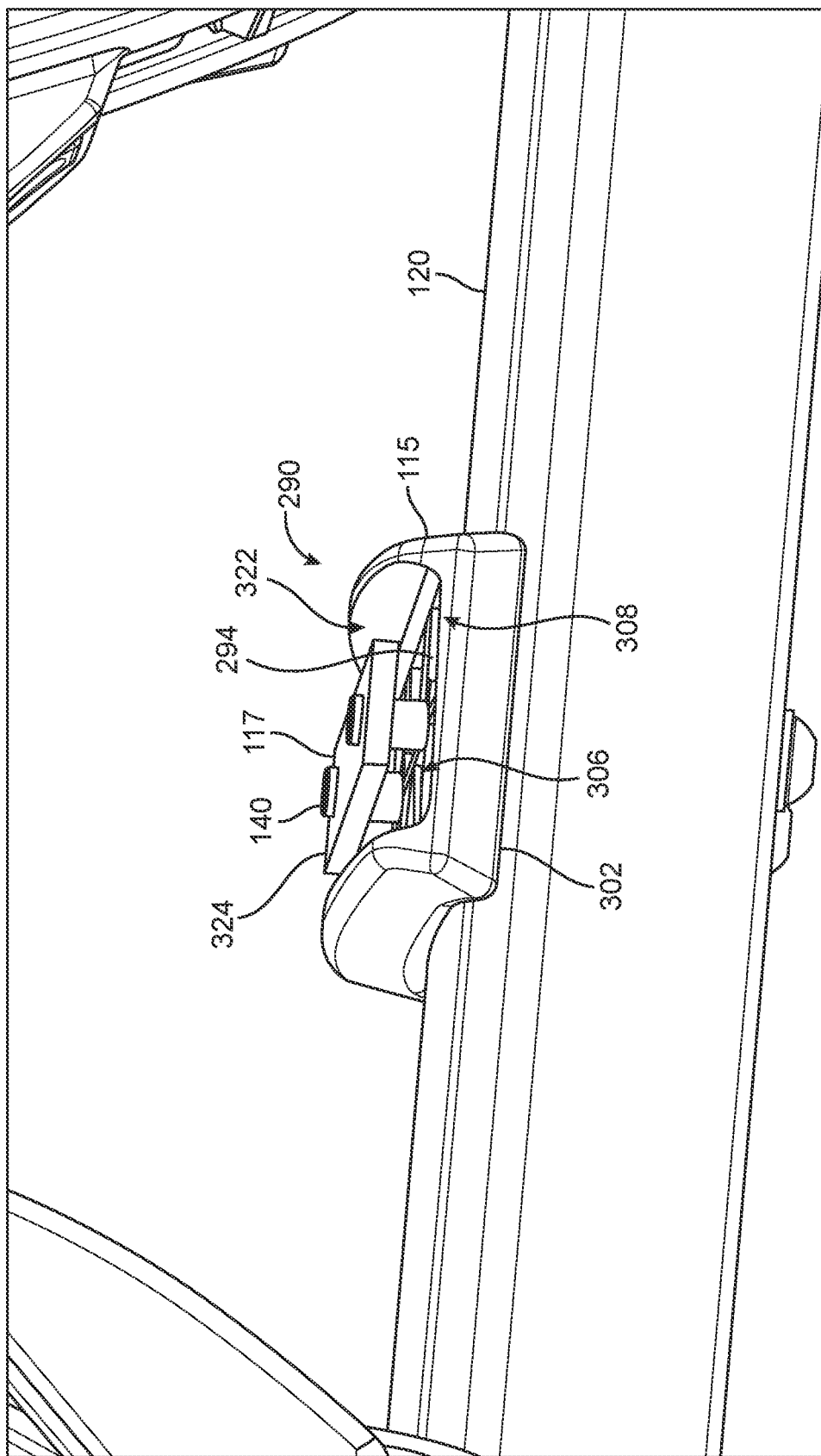
FIG. 15 is a side view of the leveling device of FIG. 14.
Figure 16:
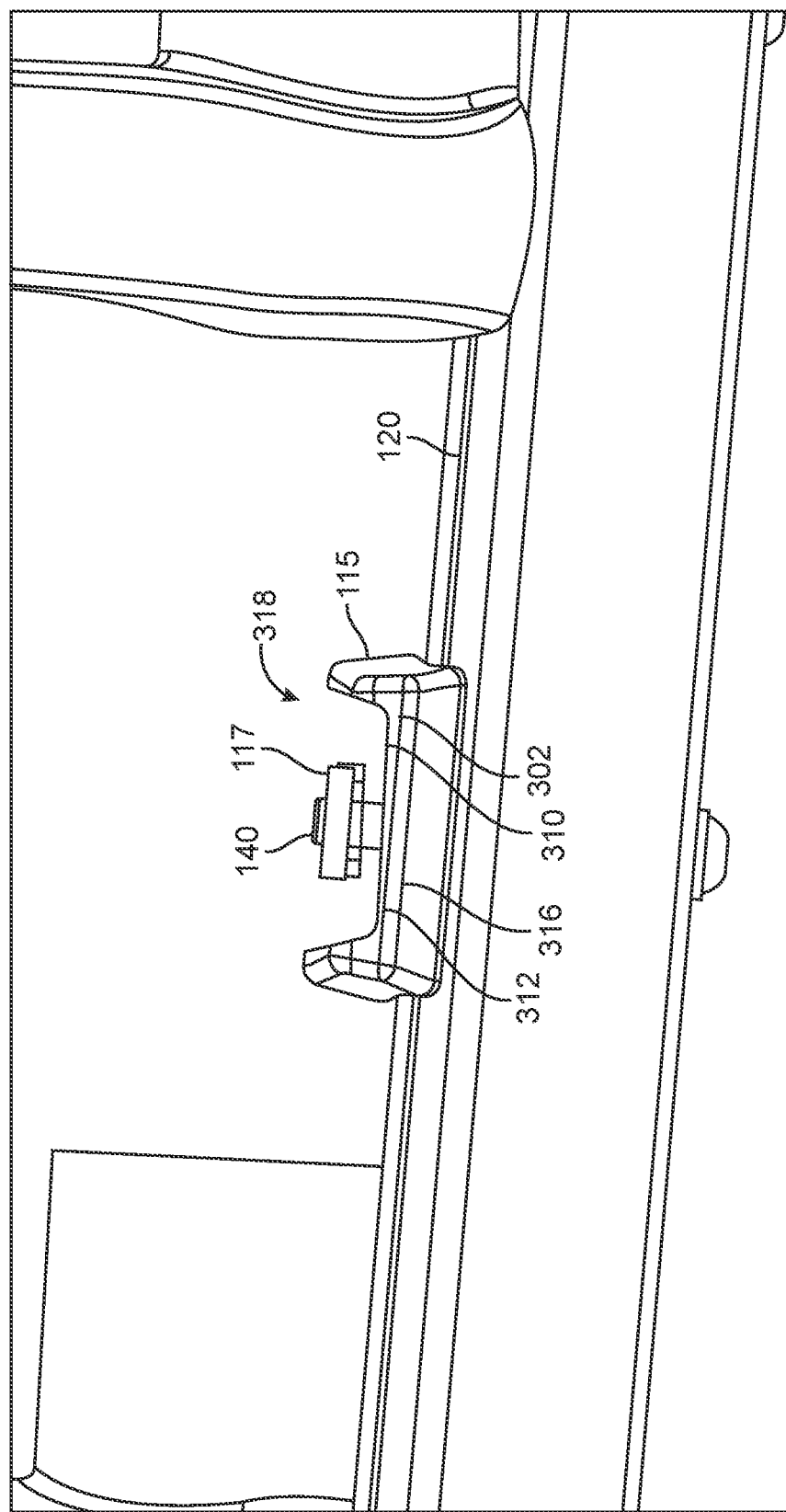
FIG. 16 is the leveling device of FIG. 14 viewed from a different angle.

As illustrated in FIGS. 15 and 16 the leveling device 115 can be a squaring arrangement 290. The squaring arrangement 290 can be configured to have a non-uniform thickness across the width of the bicycle support bar (not shown). In at least on example, the squaring arrangement 290 can be a leveling device 115. The non-uniform thickness of the leveling device 115 can be configured to reduce the angle of the bicycle support bar caused by the inclination of the rearwardly extending frame member 120 when in a bicycle carrying configuration. In at least one example, the leveling device 115 can have an elongate trough 322 creating a substantially U-shaped upper surface configured to cradle bicycle support bar. In an alternative example, the leveling device 115 can have a substantially flat upper surface configured to receive bicycle support bar 110. A top side 306 of the leveling device 115 can be configured to receive the bicycle support bar 110. An opposite side 308 of the leveling device 115 can be configured to receive the rearwardly extending frame member 120.

Fastener 140 can be configured to secure the projection 117 and leveling device 115 to the bicycle support bar (not shown). The fastener 140 can be a bolt, screw, clamp, or any other suitable releasable securement mechanism. As illustrated in FIGS. 15 and 16, the bicycle carrier support arrangement 100 can include a pair of fasteners 140.

The fastener 140 can be configured to be loosened allowing the bicycle support bar to be repositioned. The bicycle support bar can move laterally with respect to the rearwardly facing frame member 120 and the projection 117 can travel within the elongate track (not shown) and within the elongate fastenable zone (not shown). The fastener can be tightened to secure the bicycle support bar in position. The projection 117 being received in the elongate track resists detachment of the bicycle support bar from the leveling device 115.

As may be appreciated in FIGS. 15 and 16, the longitudinal axis of the leveling device 115 can be oriented substantially perpendicular to the longitudinal axis of the rearwardly extending frame member 120.

Figure 17:
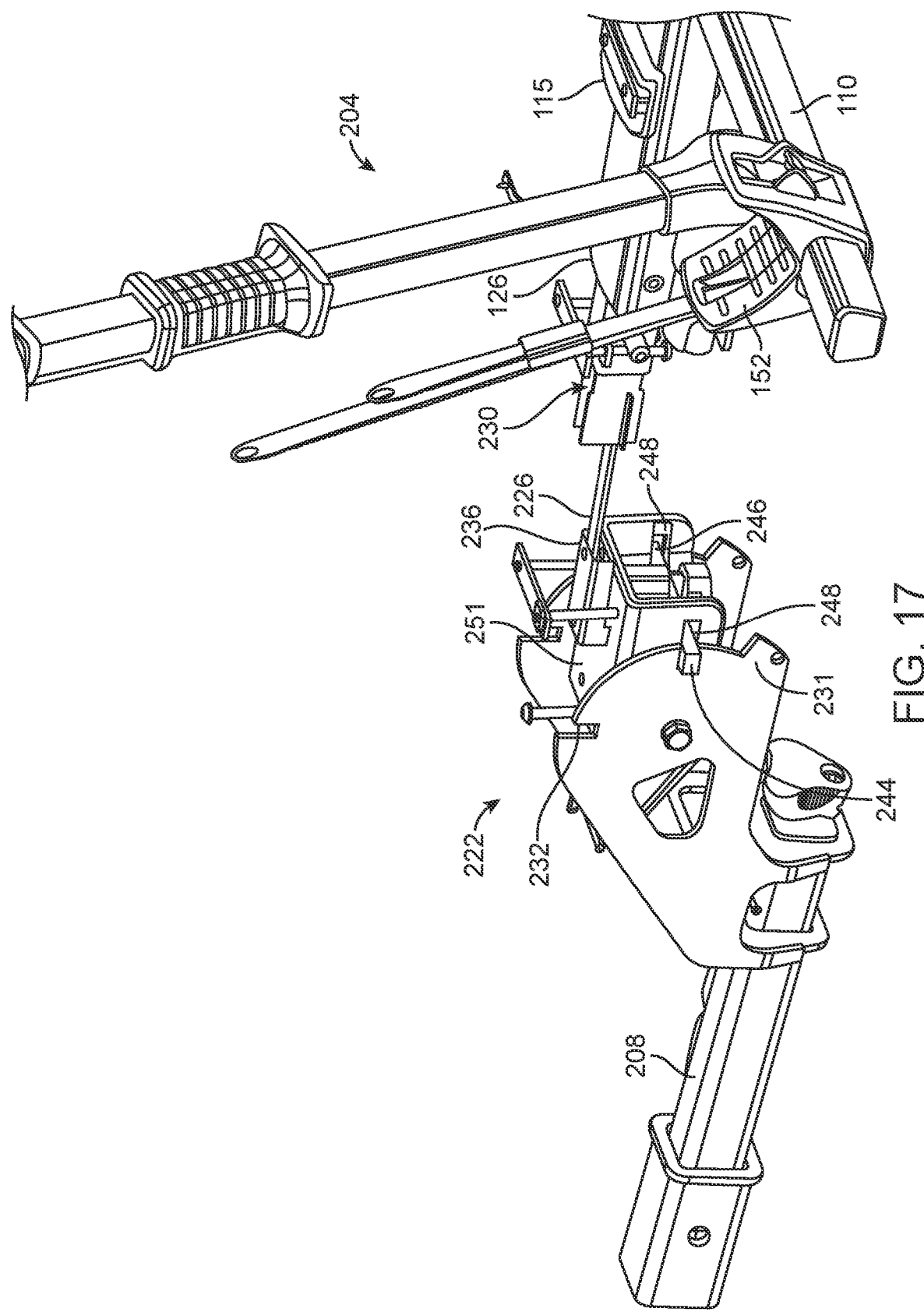
FIG. 17 is an isometric, cutaway view of a variably configurable hub and a partially disassembled frame member.

FIG. 17 illustrates a partially disassembled view of a variably configurable hub 222 and rearwardly extending frame member 120. The variably configurable hub 222 can include a setting device 231 and actuable locking member 236. The actuable locking member 236 can include a substantially straight insert pin 244 having opposite ends 246 that are respectively positioned in one of a pair of oppositely orientated substantially linear tracks 248. The substantially linear tracks 248 can be substantially parallel to an actuation path of an actuable trigger 238. The substantially straight insert pin 244 can be supported by a pin carriage 251 at a plurality of locations along a length of the insert pin 244. The setting device 231 can have a plurality of recesses 234 in which the actuable locking member 236 can be selectively engaged for establishing respective orientations of the rearwardly extending frame member 120 relative to a stinger 208. The variably configurable hub 222 can be operably coupled to the manual actuator 224 by a linkage 226 that is at least partially housed within the frame member 120. As may be appreciated in FIG. 17, the insert pin 244 can be received within one of the plurality of recesses in the setting device 231 establishing the bicycle support arrangement in a bicycle carrying configuration.

Figure 18:
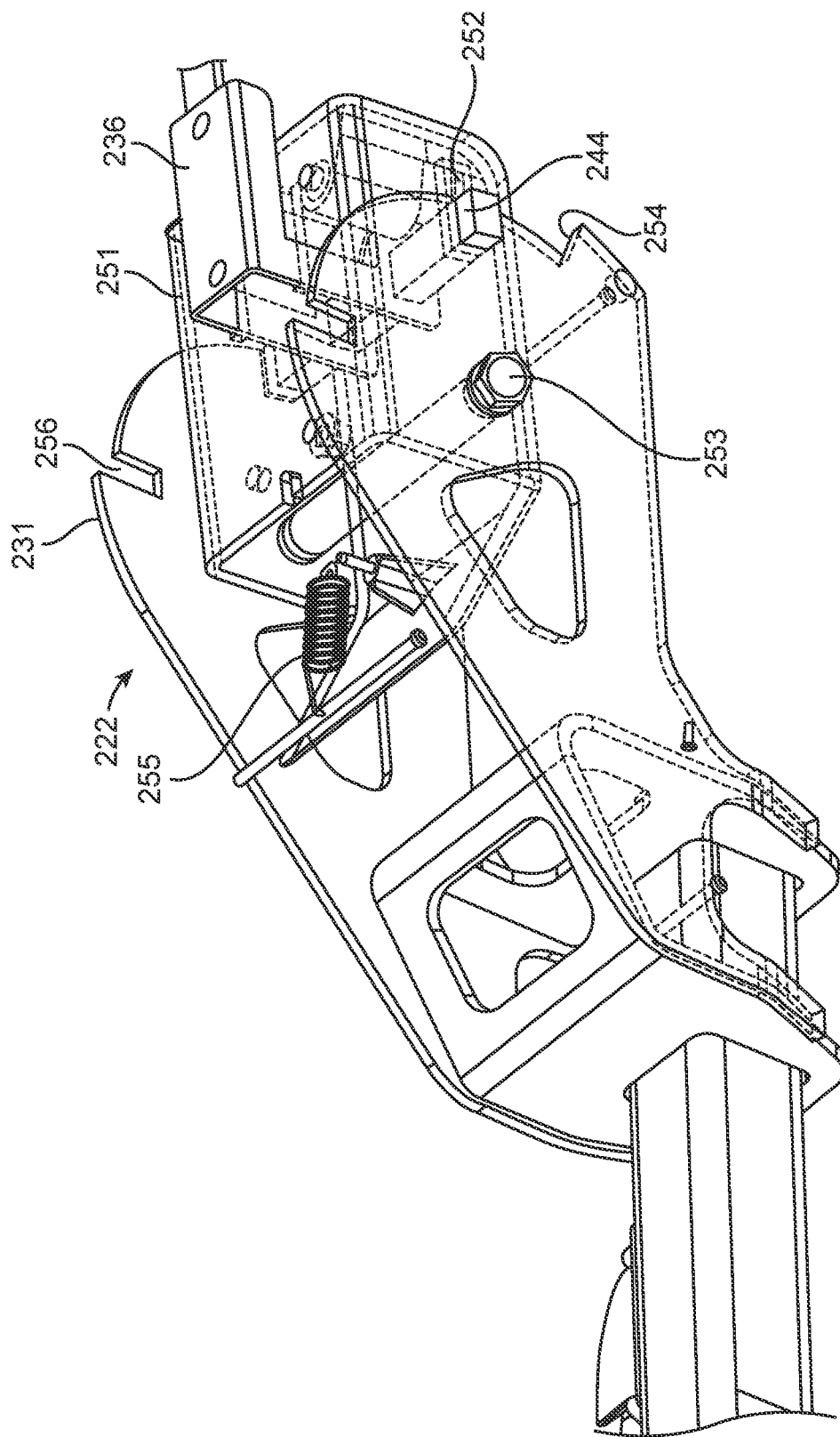
FIG. 18 is an elevational, cutaway view of a variably configurable hub having a transparent portion of a setting device and pin carriage.
Figure 19:
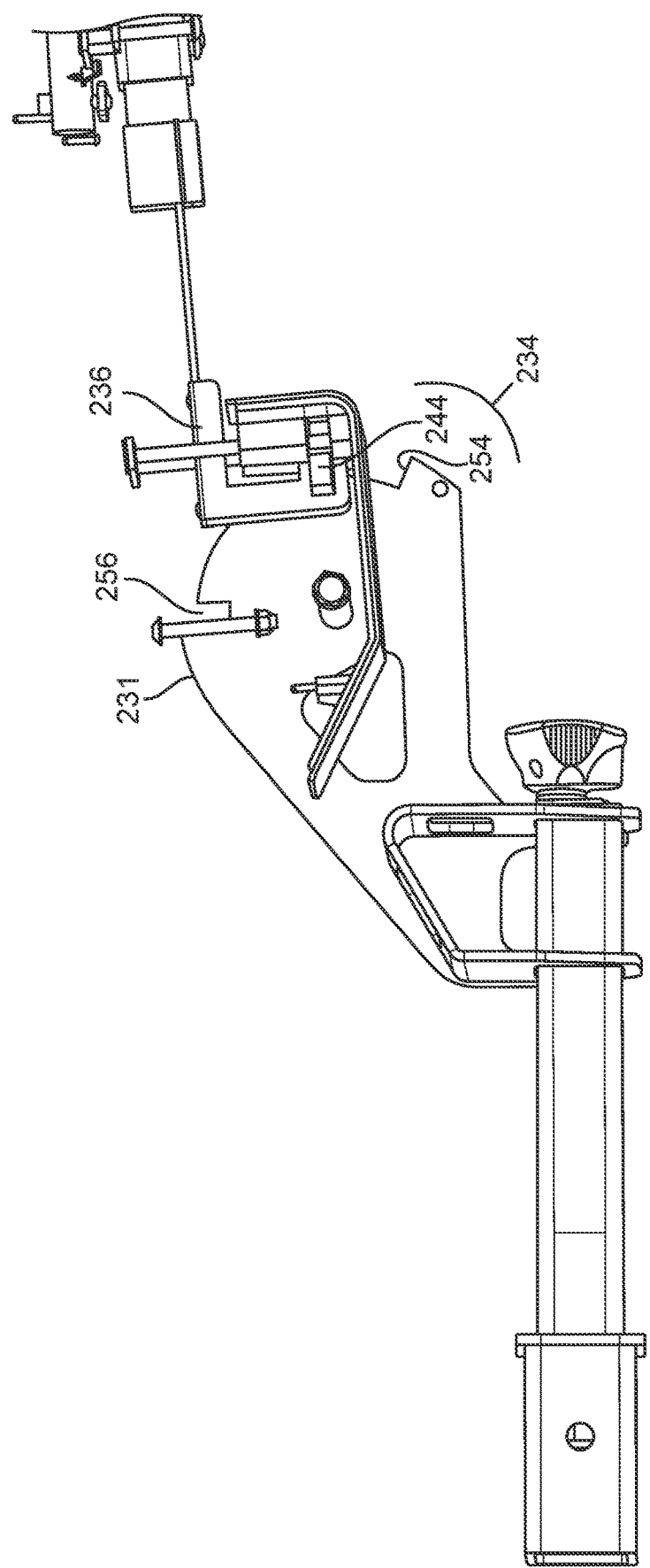
FIG. 19 is a side, plan cutaway view of the variably configurable hub of FIG. 18.
Figure 20:
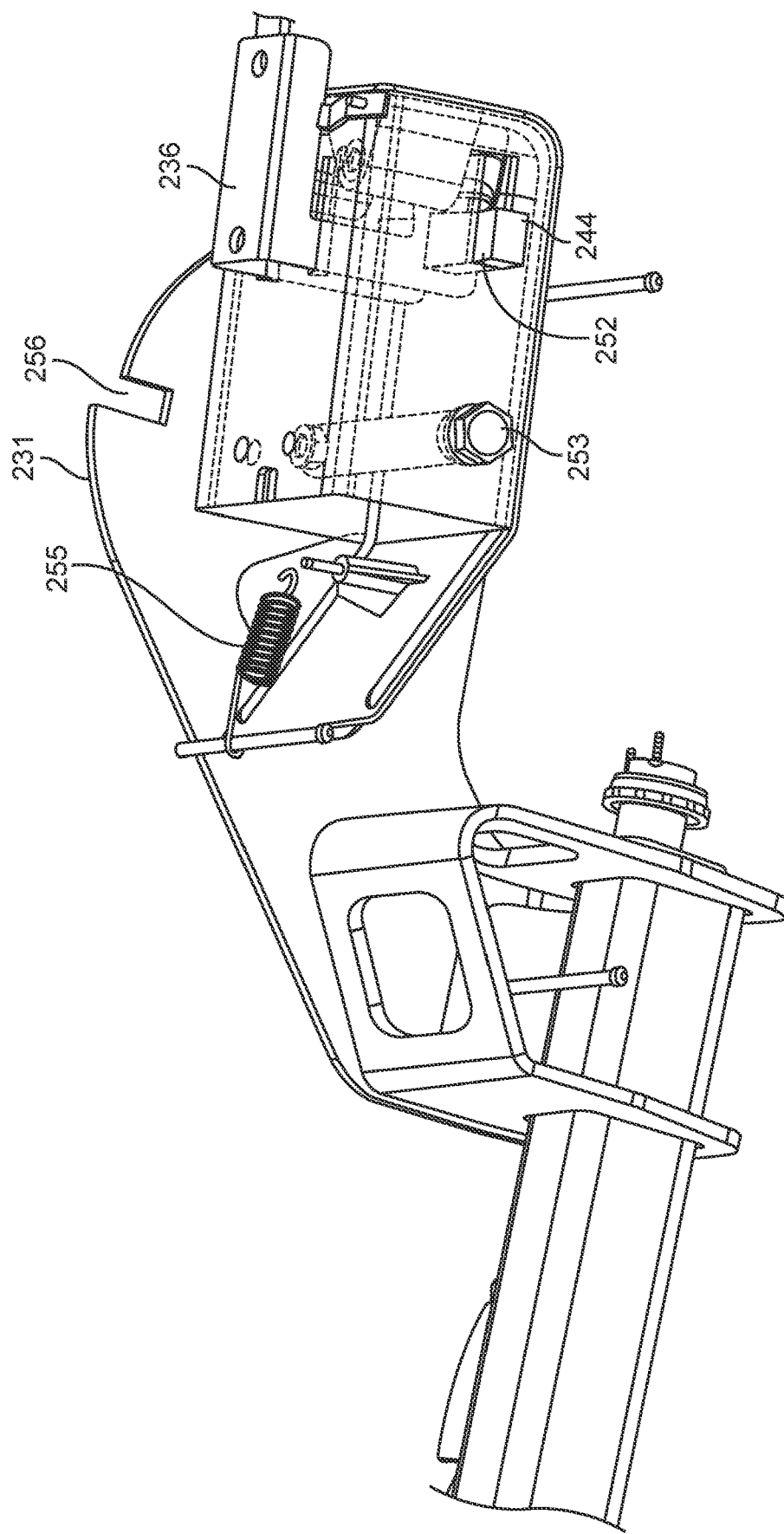
FIG. 20 is an elevational cutaway view of the variably configurable hub of FIG. 18.

FIGS. 18-20 illustrate a partially disassembled view of a variably configurable hub 222. The setting device 231 can have a plurality of recesses including a first recess 252, a second recess 254, and a third recess 256. The setting device 231 can also include an actuable locking member 236 configured to transition an insert pin 244 between the plurality of recesses. The actuable locking member 236 can be operably coupled to a pin carriage 251. The pin carriage 251 can be configured to rotate about an axle 253 of the variably configurable hub 222 as the hub 222 transitions between various configurations. The insert pin 244 can be transitionable from one of the plurality of recesses to another thereby altering the configuration of the hitch-mount bicycle rack. As shown in FIG. 17, actuating the insert pin 244 into the first recess 252 can establish a bicycle carrying configuration. Actuating the insert pin 244 into the second recess 254 can establish a bicycle loading configuration. Actuating the insert pin 244 into the third recess 256 can establish an empty configuration.

FIG. 19 illustrates a setting device 231 of a bicycle support arrangement 100. The setting device 231 can include at least one recess 232. The setting device 231 can also include a plurality of recesses 234. The plurality of recesses 234 can be configured to receive an insert pin 244 to place a rearwardly extending frame member 120 of the hitch-mount bicycle rack 200 of the bicycle support arrangement 100 in various orientations. The plurality of recesses 234 can include a first recess 252 which is arranged so as to put the hitch-mount bicycle rack 200 in a bicycle carrying (slightly upwardly tilted) configuration 264. The plurality of recesses 234 can also include a second recess 254 which is arranged so as to put the hitch-mount bicycle rack 200 in a bicycle loading (downwardly tilted) configuration 262. The plurality of recesses 234 can further include a third recess 256 which is arranged such that the hitch-mount bicycle rack 200 can be placed in an empty configuration 158, in which the hitch-mount bicycle rack 200 is substantially vertical and at a substantially right angle with a stinger of bicycle support arrangement 100. The securement pin 244 can be actuated by a manual actuator (not shown) coupled to the linkage 226. The action of the manual actuator can draw securement pin 244 out of and away from any one of the plurality of recesses 234, allowing the pin 244 to move freely between each of one of the plurality of recesses 234, thereby enabling the hitch-mount bicycle rack 200 to be selectively placed in the empty configuration 258, the bicycle loading configuration 262 and the bicycle carrying configuration 264. It will be understood that while not illustrated, additional recesses may be included in the setting device, thereby enabling additional orientations to be achieved.

Figure 21:
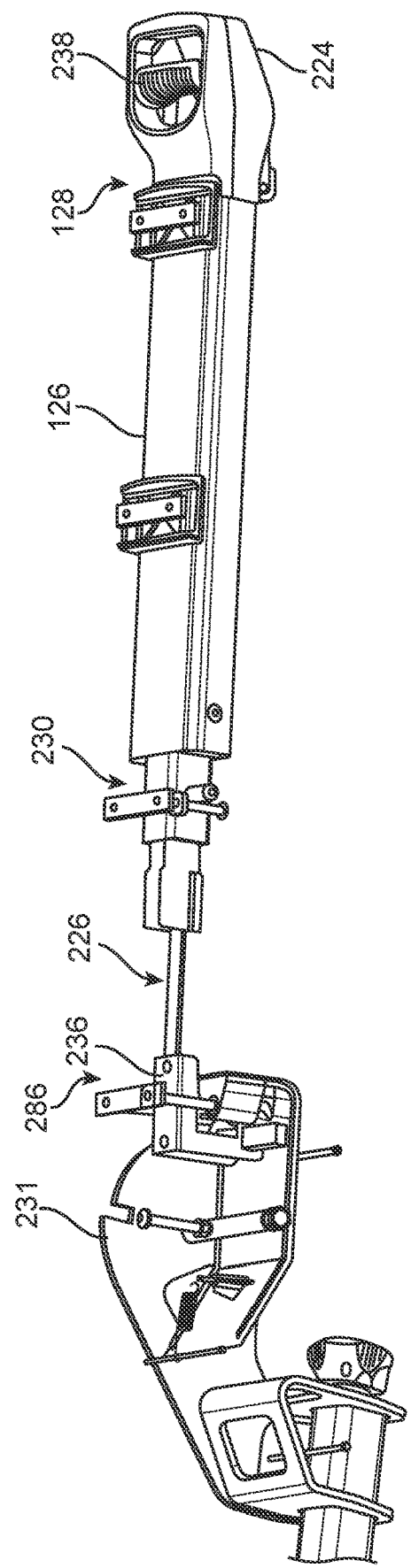
FIG. 21 is an isometric view of a variably configurable hub coupled to a manual actuator.
Figure 22:
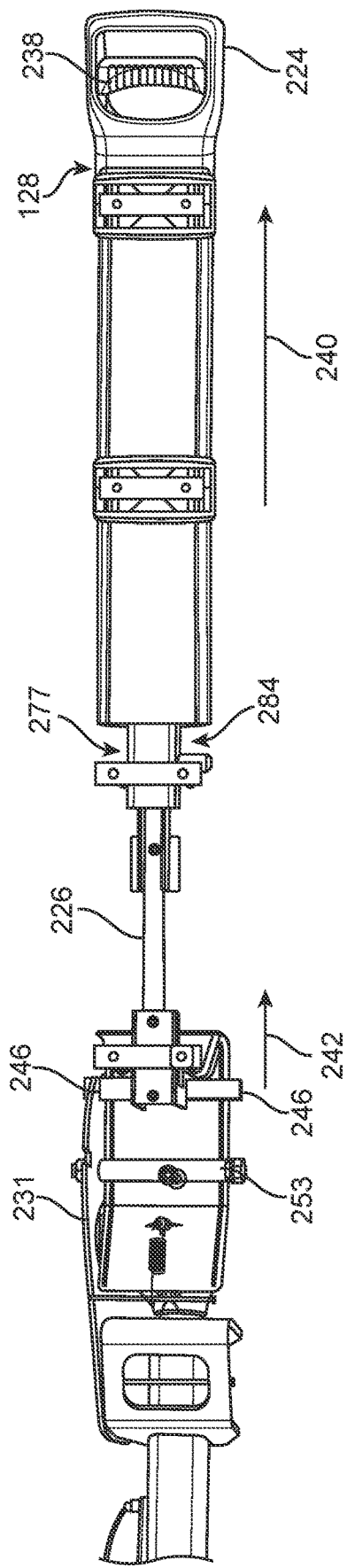
FIG. 22 is a top, plan cutaway view of the assembly of FIG. 21.
Figure 23:
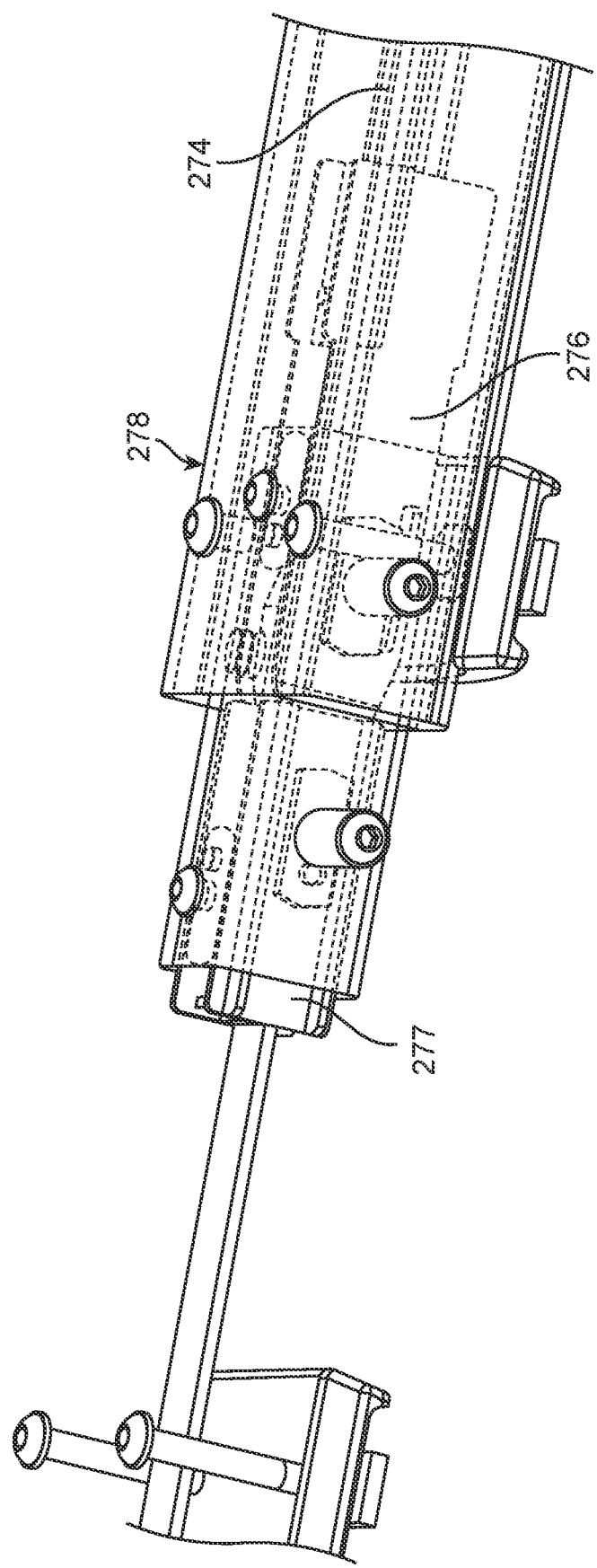
FIGS. 23-26 illustrate isometric views of a linkage between a forward connection block and a rearward connection block.
Figure 24:
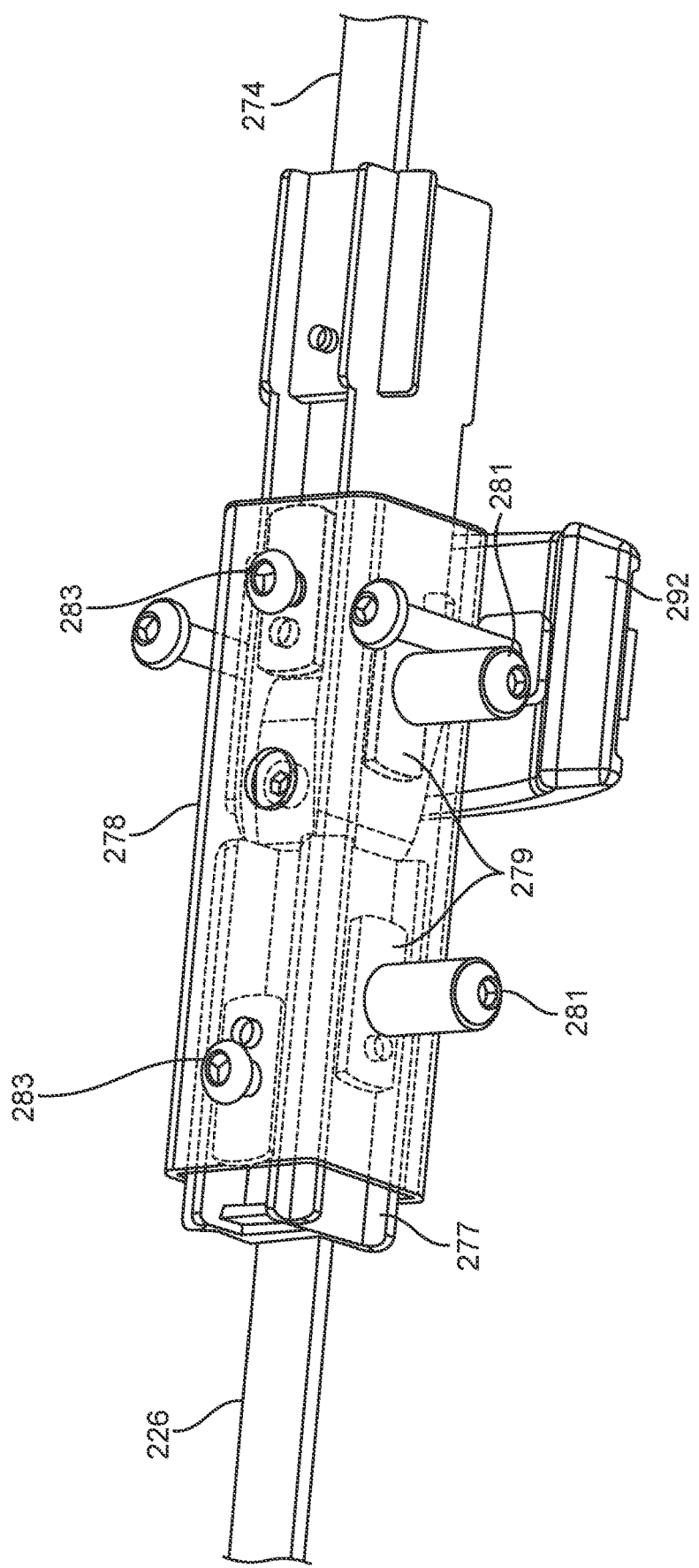

FIGS. 21-22 illustrate a cutaway view of a setting device 231 in cooperation with an actuable locking member 236. The actuable locking member 236 can be drawn in a direction away from the setting device 231 as described above. The locking member 236 is located at an end 286 of the linkage 226 proximate to the setting device 231. The linkage 226 has a distal end 230 which is connected to the add-on frame 126. At the distal end 128 of the add-on frame there is located a manual actuator 224. The manual actuator 224 includes an actuable trigger 238. The actuable trigger 238 is in working cooperation with linkage 226 and actuable locking member 236. When actuable trigger 238 is pulled in direction 240, linkage 226 pulls pin 246 in the same direction 242 and along the axis of the add-on frame 126.

Figure 25:
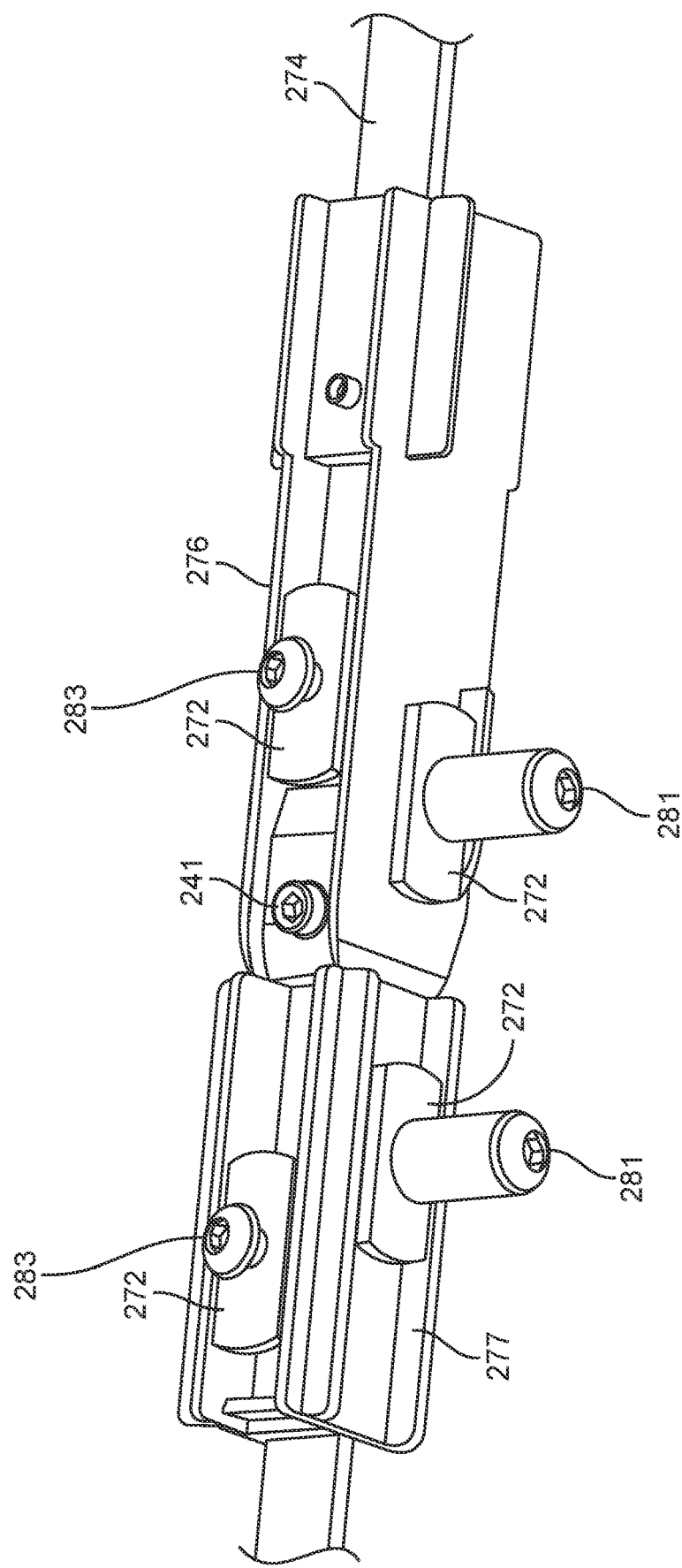
Figure 26:
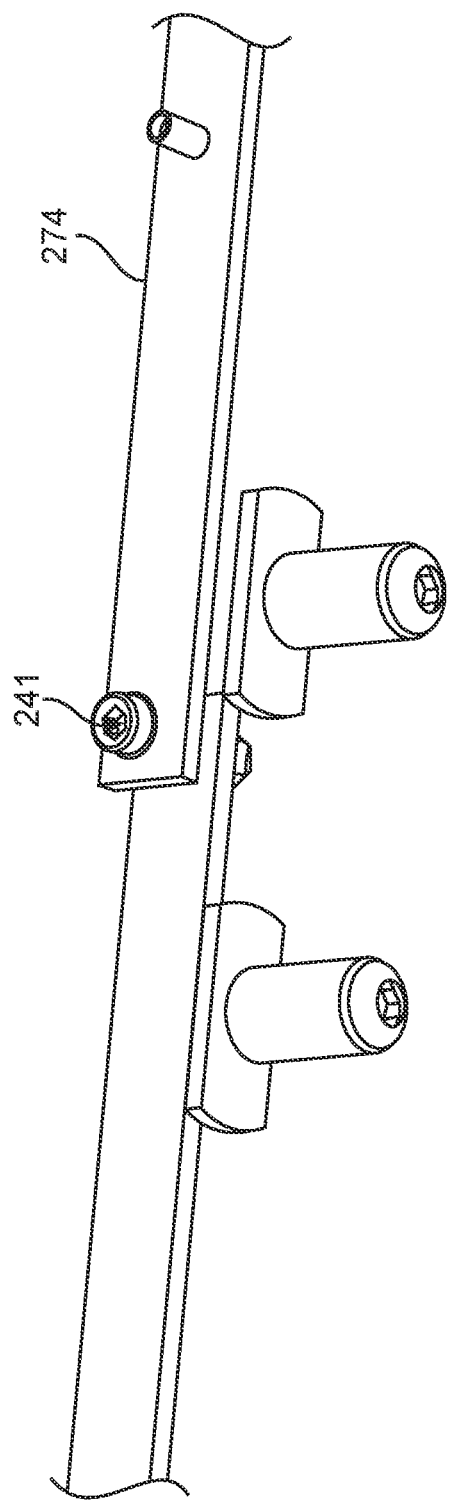

FIGS. 23-26 illustrate the connective region between forward connection block 277 and rearward connection block 276 used to connect the add-on frame to the rearwardly extending support member. Specifically, a linkage extension 274 is connected to the linkage 226. The blocks 276, 277 reside within sleeve 278 which is within the member 120 and add-on frame member 126. Tabs 279 are attached to the sleeve 278 by tab pins 281 and tab fasteners 283. Blocks 277 and 276 can slide within the sleeve 278 during locking and unlocking of the insert pin 244 within the recesses 234 of the setting device 231. As illustrated in FIGS. 25-26 the linkage 226 and the linkage extension 274 are coupled to one another by linking pin 241.

Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure to the full extent indicated by the broad general meaning of the terms used in the attached claims. It will therefore be appreciated that the examples described above may be modified within the scope of the appended claims.

What is claimed is:

1. A bicycle carrier, comprising:
   a vehicle engaging frame portion configured to be coupled a carrying vehicle; and
   a rearward extending support member coupled to the vehicle engaging frame portion by a variably configurable hub configured to set the support member in a plurality of orientations relative to the vehicle engaging frame portion, wherein the support member accommodates one or more bicycles, and
   wherein the support member is configured to be coupled to an add-on support member that accommodates one or more additional bicycles, the add-on support member comprising an actuator configured to set the support member in the plurality of orientations relative to the vehicle engaging frame.

2. The bicycle carrier of claim 1, wherein the add-on support member is configured to be coupled to a distal end of the support member.

3. The bicycle carrier of claim 1, wherein the actuator is operably coupled to the variably configurable hub by a linkage.

4. The bicycle carrier of claim 1, wherein the actuator is configured to translate linearly.

5. The bicycle carrier of claim 4, wherein the actuator is configured to translate in a direction substantially parallel to a longitudinal axis of the support member.

6. The bicycle carrier of claim 1, further comprising the add-on support member.

7. The bicycle carrier of claim 1, wherein the support member is disposed along a longitudinal axis extending in a direction of travel of the carrying vehicle.

8. The bicycle carrier of claim 1, wherein the actuator is configured to be decoupled from a distal end of the add-on support member and coupled to a distal end of the support member.

9. A bicycle carrying system, comprising:
   a first bicycle carrying portion for carrying at least one bicycle having a vehicle engaging frame configured to be coupled a carrying vehicle and a rearward extending support member coupled to the vehicle engaging frame portion by a variably configurable hub configured to set the support member in a plurality of orientations relative to the vehicle engaging frame portion; and
   an add-on support member for carrying at least one additional bicycle, the add-on support member configured to be coupled to the first bicycle carrying portion and comprising an actuator configured to set the support member in the plurality of orientations relative to the vehicle engaging frame.

10. The bicycle carrying system of claim 9, wherein the add-on support member is configured to be coupled to an end of the support member of the first bicycle carrying portion.

11. The bicycle carrying system of claim 9, further comprising a connection block configured to couple the add-on support member to the support member of the first bicycle carrying portion.

12. The bicycle carrying system of claim 9, wherein the actuator translates in a linear direction.

13. The bicycle carrying system of claim 9, wherein the actuator moves in a direction distally from a distal end of the support member.

14. The bicycle carrying system of claim 9, wherein the support member comprises a central beam.

15. The bicycle carrying system of claim 14, wherein a linkage between the actuator and the variably configurable hub is disposed within the central beam.

16. A method of operating a bicycle carrier, the method comprising:
   coupling a first bicycle carrying portion for carrying at least one bicycle to a vehicle;
   coupling an add-on support member for carrying at least one additional bicycle to the first bicycle carrying portion; and
   actuating an actuator disposed on the add-on support member to set the first bicycle carrying portion and the add-on support member in a plurality of orientations.

17. The method of claim 16, wherein actuating the actuator comprises moving the actuator in a linear direction.

18. The method of claim 16, wherein the actuator is disposed at a distal end of the add-on support member.

19. The method of claim 16, wherein coupling the add-on support member to the first bicycle carrying portion comprises coupling a proximal end of the add-on support member to a distal end of a support member of the first bicycle carrying portion.

20. The method of claim 16, wherein setting the first bicycle carrying portion and the add-on support member in the plurality of orientations comprises:
   rotating the first bicycle carrying portion and the add-on support member to a first position such that the first bicycle carrying portion and the add-on support member are disposed in a direction parallel to a direction of travel of the vehicle; and
   rotating the first bicycle carrying portion and the add-on support member to a second position such that the first bicycle carrying portion and the add-on support member are disposed in a direction perpendicular to the direction of travel of the vehicle.

* * * * *

UNITED STATES PATENT AND TRADEMARK OFFICE
CERTIFICATE OF CORRECTION

PATENT NO. : 11,225,200 B2
APPLICATION NO. : 17/241290
DATED : January 18, 2022
INVENTOR(S) : Keith L. Prescott et al.

Page 1 of 1

It is certified that error appears in the above-identified patent and that said Letters Patent is hereby corrected as shown below:

In the Claims

In Claim 1, Lines 2–3, please replace "a vehicle engaging frame portion configured to be coupled a carrying vehicle" with --a vehicle engaging frame portion configured to be coupled to a carrying vehicle--

In Claim 9, Lines 3–4, please replace "a vehicle engaging frame configured to be coupled a carrying vehicle" with --a vehicle engaging frame configured to be coupled to a carrying vehicle--

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*